US009632983B2

(12) United States Patent
Ueda et al.

(10) Patent No.: US 9,632,983 B2
(45) Date of Patent: Apr. 25, 2017

(54) IMAGE PROJECTION SYSTEM AND IMAGE PROJECTION METHOD

(71) Applicant: Roland DG Corporation, Hamamatsu-shi, Shizuoka (JP)

(72) Inventors: Jun Ueda, Hamamatsu (JP); Yasutoshi Nakamura, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 268 days.

(21) Appl. No.: 14/680,236

(22) Filed: Apr. 7, 2015

(65) Prior Publication Data

US 2015/0287169 A1    Oct. 8, 2015

(30) Foreign Application Priority Data

Apr. 8, 2014    (JP) ................................. 2014-079588

(51) Int. Cl.

| G06T 5/00 | (2006.01) |
|---|---|
| G06F 17/16 | (2006.01) |
| G06T 3/40 | (2006.01) |
| B29C 67/00 | (2017.01) |
| G06T 7/33 | (2017.01) |

(Continued)

(52) U.S. Cl.
CPC .......... *G06F 17/16* (2013.01); *B29C 67/0062* (2013.01); *B29C 67/0088* (2013.01); *G06T 3/40* (2013.01); *G06T 7/33* (2017.01); *B33Y 10/00* (2014.12); *B33Y 50/02* (2014.12); *G06T 2207/30208* (2013.01)

(58) Field of Classification Search
CPC . G06F 17/16; B29C 67/0062; B29C 67/0088; G06T 7/0028; G06T 3/40; G06T 2207/30208; B33Y 10/00; B33Y 50/02
See application file for complete search history.

(56) References Cited

U.S. PATENT DOCUMENTS

| 6,611,241 B1 * | 8/2003 | Firester .................... H04N 9/12 345/1.1 |
|---|---|---|
| 2010/0125356 A1 * | 5/2010 | Shkolnik ............. B29C 67/0088 700/98 |

(Continued)

FOREIGN PATENT DOCUMENTS

JP    4002983 B2    11/2007

*Primary Examiner* — Jayanti K. Patel
*Assistant Examiner* — Joseph Suh
(74) *Attorney, Agent, or Firm* — Keating and Bennett, LLP

(57) ABSTRACT

An image projection system includes a second transform matrix calculator that calculates a second projection transform matrix usable to projection-transform first intersection coordinates into intersection coordinates uniformly or substantially uniformly distributed in a first area and calculates a third projection transform matrix usable to projection-transform second intersection coordinates into intersection coordinates uniformly or substantially uniformly distributed in a second area; and an image corrector that transforms image data on a first divided image by use of the second projection transform matrix, transforms image data on a second divided image by use of the third projection transform matrix, and translates at least one of the first divided image and the second divided image toward a borderline between the first divided image and the second divided image to delete a gap between the first divided image and the second divided image.

12 Claims, 21 Drawing Sheets

(51) Int. Cl.
    *B33Y 50/02*    (2015.01)
    *B33Y 10/00*    (2015.01)

(56) References Cited

U.S. PATENT DOCUMENTS

| | | | |
|---|---|---|---|
| 2010/0149315 A1* | 6/2010 | Qu | A61B 1/00193 348/46 |
| 2012/0128248 A1* | 5/2012 | Hamada | G06T 7/0079 382/173 |
| 2013/0222386 A1* | 8/2013 | Tannhauser | G06T 3/4038 345/428 |
| 2013/0242090 A1* | 9/2013 | Yoshikawa | G01B 11/026 348/136 |

\* cited by examiner q : CENTER COORDINATE AT SUB PIXEL PRECISION AT WHICH
    CHECKER INTERSECTION COORDINATES ARE TO BE DETECTED p : COORDINATE OF EACH POINT IN CIRCULAR FIELD OF VIEW R Dpi : LUMINANCE GRADIENT VECTOR AT pi

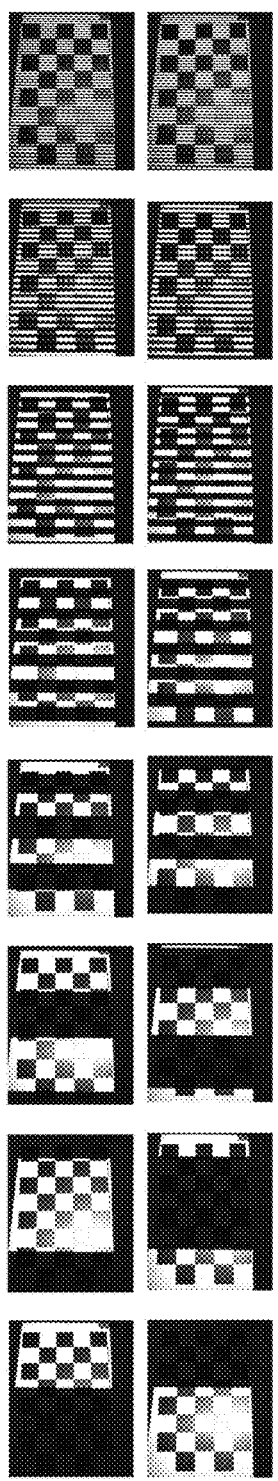
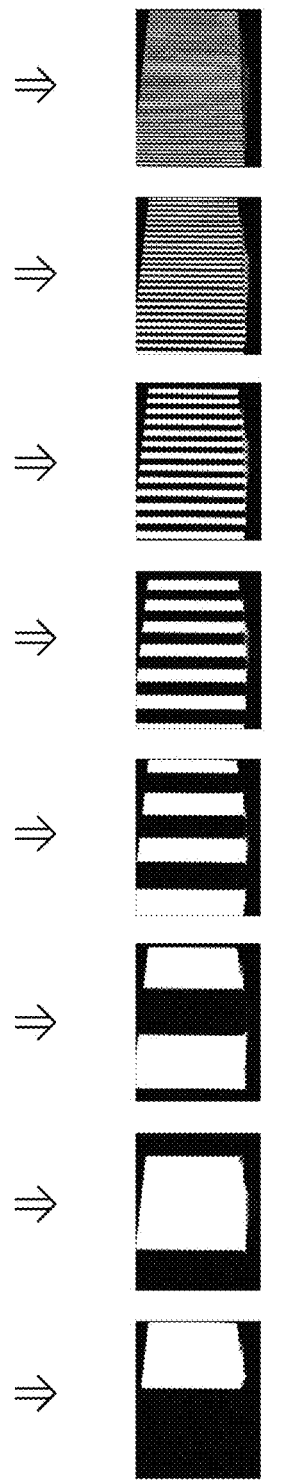
FIG.7A GRAY CODE PATTERN EXTENDING IN THE VERTICAL DIRECTION
POSITIVE IMAGE
NEGATIVE IMAGE
FIG.7B BINARY IMAGE
FIG.7C SPATIAL CODE IMAGE HAVING CODE VALUE VARYING IN THE HORIZONTAL DIRECTION

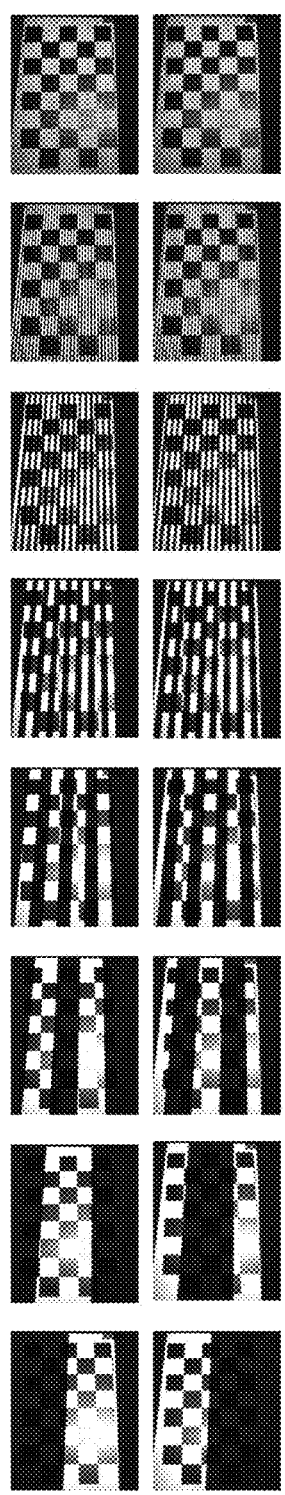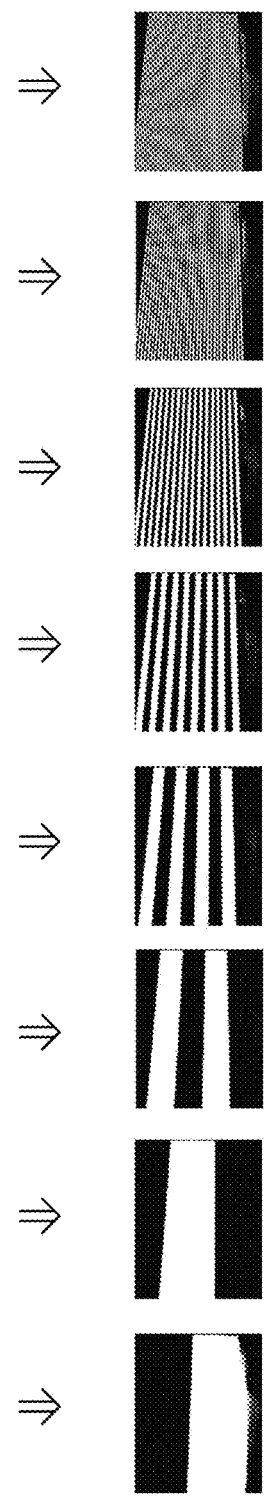
FIG.8A GRAY CODE PATTERN EXTENDING IN THE HORIZONTAL DIRECTION
POSITIVE IMAGE
NEGATIVE IMAGE
FIG.8B BINARY IMAGE
FIG.8C SPATIAL CODE IMAGE HAVING CODE VALUE VARYING IN THE VERTICAL DIRECTION

FIG.11
SPATIAL CODE IMAGE HAVING CODE
VALUE VARYING IN THE HORIZONTAL
DIRECTION
BORDERLINES PARALLEL TO EACH OTHER
IN THE HORIZONTAL DIRECTION
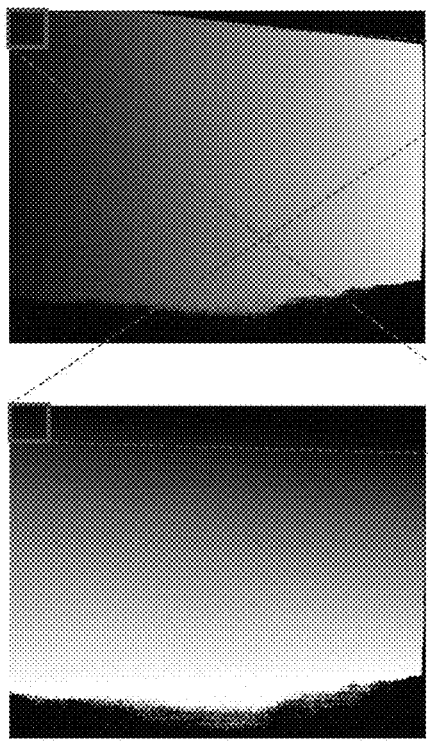
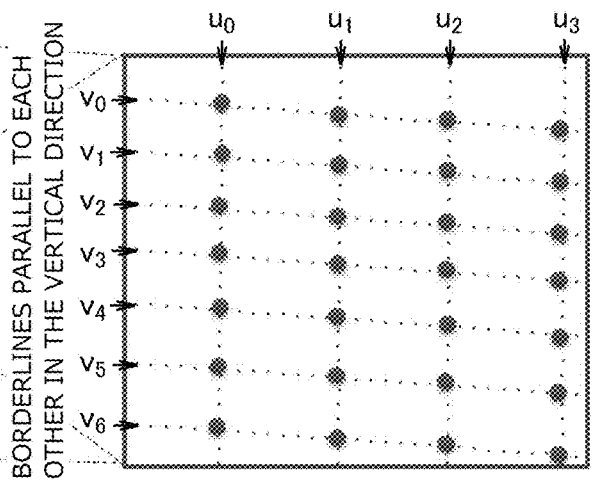
SPATIAL CODE IMAGE HAVING CODE
VALUE VARYING IN THE VERTICAL
DIRECTION

GROUP OF POST-TRANSFORM INTERSECTIONS ON PRINTING AREA COORDINATE SYSTEM

PRINTING AREA (IMAGE PROJECTION AREA)

GROUP OF INTERSECTIONS ON CAMERA-CAPTURED IMAGE $(1366+5)/6=228$

THE CODE VALUE VARYING IN THE HORIZONTAL DIRECTION IS 0 - 227.

THE BORDERLINES Un PARALLEL TO EACH OTHER IN THE HORIZONTAL DIRECTION ARE $U_0$ - $U_{226}$.

$(768+2)/3=256$

THE CODE VALUE VARYING IN THE VERTICAL DIRECTION IS 0 - 255.

THE BORDERLINES Vn PARALLEL TO EACH OTHER IN THE VERTICAL DIRECTION ARE $V_0$ - $V_{254}$.

FIG.19A

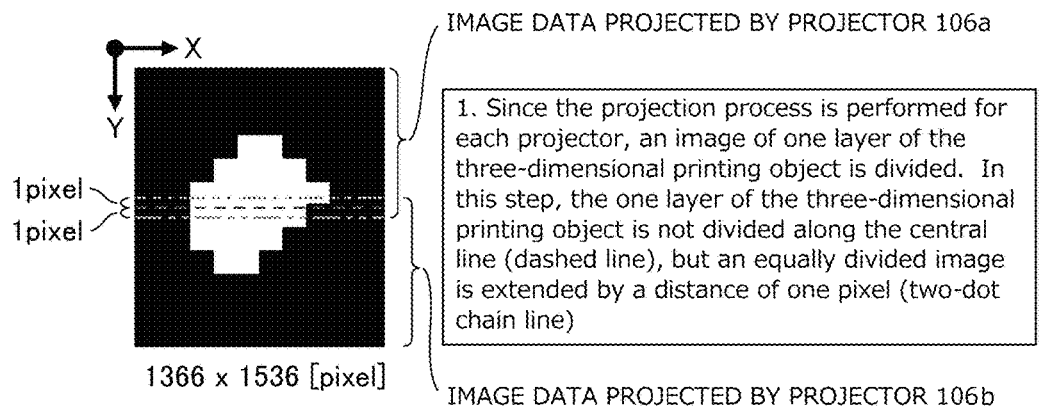

IMAGE DATA PROJECTED BY PROJECTOR 106a

1. Since the projection process is performed for each projector, an image of one layer of the three-dimensional printing object is divided. In this step, the one layer of the three-dimensional printing object is not divided along the central line (dashed line), but an equally divided image is extended by a distance of one pixel (two-dot chain line)

IMAGE DATA PROJECTED BY PROJECTOR 106b 1366 x 1536 [pixel]

FIG.19B

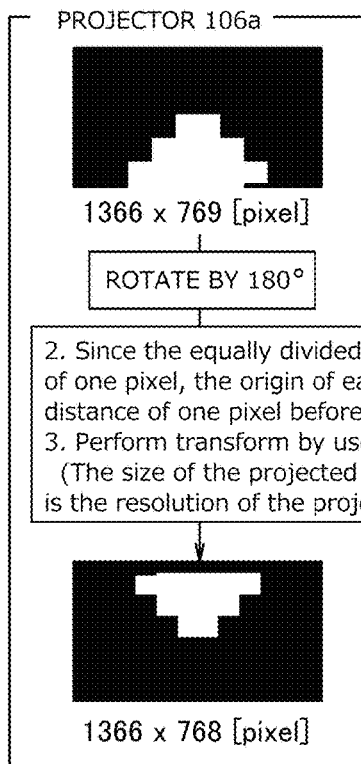

PROJECTOR 106a 1366 x 769 [pixel]

ROTATE BY 180°

FIG.19C

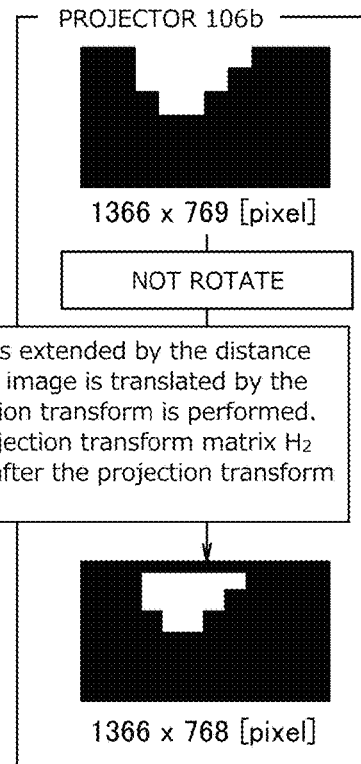

PROJECTOR 106b 1366 x 769 [pixel]

NOT ROTATE

2. Since the equally divided image is extended by the distance of one pixel, the origin of each slice image is translated by the distance of one pixel before projection transform is performed.
3. Perform transform by use of projection transform matrix $H_2$
   (The size of the projected image after the projection transform is the resolution of the projector.)

1366 x 768 [pixel]

1366 x 768 [pixel]

IMAGE PROJECTION SYSTEM AND IMAGE PROJECTION METHOD

The present application claims priority from Japanese Patent Application No. 2014-079588 filed on Apr. 8, 2014, which is incorporated by reference herein in its entirety.

BACKGROUND OF THE INVENTION

1. Field of the Invention

The present invention relates to an image projection system and an image projection method.

2. Description of the Related Art

A conventional optical printing device produces a three-dimensional printing object by use of a photocurable resin in a liquid state having a property of being cured by being irradiated with light such as visible light, ultraviolet light or the like. Such an optical printing device uses, for example, a suspension stacking system, by which a three-dimensional printing object is produced by stacking layers of a photocurable resin cured into a predetermined shape. By the suspension stacking system, a three-dimensional printing object is produced as follows. A light-transmissive plate is provided on a bottom surface of a container that accommodates a liquid photocurable resin in a liquid state, and a bottom surface of the light-transmissive plate is irradiated with light directed from below the light-transmissive plate. The photocurable resin is cured by a predetermined thickness on a printing object holding plate located in the container to form a cured layer. Next, the cured layer is peeled off from the light-transmissive plate, and the printing object holding plate is raised by a predetermined thickness. Then, the photocurable resin is irradiated with light directed from below the light-transmissive plate to form another cured layer, and the newly cured layer is stacked on the first cured layer. Such a process is repeated to stack cured layers, and thus a three-dimensional printing object is produced.

In such an optical printing device, predetermined image data is output from a controller to a projector in order to cure the photocurable resin accommodated in the container into a desired shape. The projector projects a predetermined image to an interface between the bottom surface of the container and the photocurable resin based on the image data. According to an existing image projection system, one cross-sectional image of a three-dimensional printing object is formed by two images projected to an image projection area by two projectors. The image projection area is divided into areas each having a predetermined area, and images are respectively projected to the divided areas by different projectors. Hereinafter, an image projected to such a divided area will be referred to as a "divided image", whereas an image projected to the entirety of the image projection area and including a plurality of divided images will be referred to as a "large image".

An example of projection of a large image will be described. For example, an image of "A" is projected to an image projection area having a width of 121 mm (6862 pixels) and a length of 136.1 mm (7716 pixels) by the following method using two projectors each capable of projecting an image of 1366×768 pixels. First, as shown in FIG. 21A, the image projection area is divided into an area S1, which is above the center line in a length direction (vertical direction), and an area S2, which is below the center line. The area S1 is set as an area to which a first projector is to project an image, and the area S2 is set as an area to which a second projector is to project an image. Next, as shown in FIG. 21B, the image of "A" to be projected to the image projection area is divided into a divided image P1 to be projected to the area S1 and a divided image P2 to be projected to the area S2. The divided image P1 is set as an image to be projected by the first projector, and the divided image P2 is set as an image to be projected by the second projector. Then, the divided image P1 is projected by the first projector to the area S1, and the divided image P2 is projected by the second projector to the area S2. Thus, the image of "A" is projected to the entirety of the image projection area.

However, with this image projection system, it is required to adjust the position or the posture of each of the projectors in order to appropriately project the divided images to the areas. The expression "appropriately project" refers to that the divided images are projected by the projectors without being distorted. A technology for adjusting the position or the posture of a projector is disclosed in, for example, Japanese Patent No. 4002983. This publication discloses providing a mechanism that adjusts the position or the posture of a projector.

However, provision of such a mechanism that adjusts the position or the posture of a projector increases the size of the image projection system. This increases the size of the entirety of the optical printing device including the image projection system mounted thereon, and also raises the production cost of the optical printing device. In this situation, an image projection system capable of performing appropriate projection without a mechanism as described above has been desired, but has not been developed so far.

SUMMARY OF THE INVENTION

Preferred embodiments of the present invention provide an image projection system and an image projection method capable of appropriately projecting an image without a mechanism that adjusts a position or a posture of a projector.

An image projection system according to a preferred embodiment of the present invention is configured to project a first divided image to a first area of an image projection area using a first image projection device and project a second divided image to a second area, adjacent to the first area, of the image projection area using a second image projection device to project a large image including the first divided image and the second divided image to the image projection area. The image projection system includes an image capturing device that captures, with a lens, an image of a first checker sheet including a checkered pattern including horizontal lines and vertical lines, the first checker sheet being placed on the image projection area; a distortion corrector that corrects a distortion, caused by the lens, of a first checker sheet image as an image of the first checker sheet captured by the image capturing device, the distortion being corrected by use of an inside parameter of the image capturing device; a checker intersection coordinate detector that detects checker intersection coordinates as intersection coordinates of the horizontal lines and the vertical lines in the post-correction first checker sheet image; a first transform matrix calculator that calculates a first transform matrix usable to projection-transform the detected checker intersection coordinates into checker intersection coordinates uniformly or substantially uniformly distributed in the image projection area; a spatial code image generator that creates a first spatial code image as a gray scale image from a first positive image and a first negative image projected to the first area by the first image projection device, the first positive image and the first negative image including a gray code pattern that has a luminance value varying in a horizontal direction, creates a second spatial code image as a gray scale image from a second positive image and a second negative image projected to the first area by the first image projection device, the second positive image and the second negative image including a gray code pattern that has a luminance value varying in a vertical direction, creates a third spatial code image as a gray scale image from a third positive image and a third negative image projected to the second area by the second image projection device, the third positive image and the third negative image including a gray code pattern that has a luminance value varying in the horizontal direction, and creates a fourth spatial code image as a gray scale image from a fourth positive image and a fourth negative image projected to the second area by the second image projection device, the fourth positive image and the fourth negative image including a gray code pattern that has a luminance value varying in the vertical direction; a border coordinate acquirer that acquires a plurality of first border coordinates in the first spatial code image from a luminance distribution curve of the first positive image and the first negative image, acquires a plurality of second border coordinates in the second spatial code image from a luminance distribution curve of the second positive image and the second negative image, acquires a plurality of third border coordinates in the third spatial code image from a luminance distribution curve of the third positive image and the third negative image, and acquires a plurality of fourth border coordinates in the fourth spatial code image from a luminance distribution curve of the fourth positive image and the fourth negative image; an intersection coordinate acquirer that acquires first borderlines each connecting first border coordinates including the same code among the plurality of first border coordinates in the first spatial code image, second borderlines each connecting second border coordinates including the same code among the plurality of second border coordinates in the second spatial code image, third borderlines each connecting third border coordinates including the same code among the plurality of third border coordinates in the third spatial code image, and fourth borderlines each connecting fourth border coordinates including the same code among the plurality of fourth border coordinates in the fourth spatial code image; and synthesizes the first spatial code image and the second spatial code image and synthesizes the third spatial code image and the fourth spatial code image to acquire first intersection coordinates of the first borderlines and the second borderlines and second intersection coordinates of the third borderlines and the fourth borderlines; a second transform matrix calculator that transforms the first intersection coordinates and the second intersection coordinates by use of the first projection transform matrix, transforms the first intersection coordinates transformed by use of the first projection transform matrix into coordinates in a local coordinate system for the first image projection device, then calculates a second projection transform matrix usable to projection-transform the first intersection coordinates into intersection coordinates uniformly or substantially uniformly distributed in the first area, transforms the second intersection coordinates transformed by use of the first projection transform matrix into coordinates in a local coordinate system for the second image projection device, and then calculates a third projection transform matrix usable to projection-transform the second intersection coordinates into intersection coordinates uniformly or substantially uniformly distributed in the second area; a divided image generator that creates a first divided image to be output to the first image projection device and a second divided image to be output to the second image projection device; and an image corrector that transforms image data on the first divided image by use of the second projection transform matrix, transforms image data on the second divided image by use of the third projection transform matrix, and translates at least one of the first divided image and the second divided image toward a borderline between the first divided image and the second divided image to delete a gap between the first divided image and the second divided image.

An image projection system according to a preferred embodiment of the present invention is an image projection system configured to project a first divided image to a first area of an image projection area using a first image projection device and projecting a second divided image to a second area, adjacent to the first area, of the image projection area using a second image projection device to project a large image including the first divided image and the second divided image to the image projection area. The image projection system includes an image capturing device that captures, with a lens, an image of a first checker sheet including a checkered pattern including horizontal lines and vertical lines, the first checker sheet being placed on the image projection area; a distortion corrector that corrects a distortion, caused by the lens, of a first checker sheet image as an image of the first checker sheet captured by the image capturing device, the distortion being corrected by use of an inside parameter of the image capturing device; a checker intersection coordinate detector that detects checker intersection coordinates as intersection coordinates of the horizontal lines and the vertical lines in the post-correction first checker sheet image; a first transform matrix calculator that calculates a first transform matrix usable to projection-transform the detected checker intersection coordinates into checker intersection coordinates uniformly or substantially uniformly distributed in the image projection area; a spatial code image generator that creates a first spatial code image as a gray scale image from a first positive image and a first negative image projected to the first area by the first image projection device, the first positive image and the first negative image including a gray code pattern that has a luminance value varying in a horizontal direction, creates a second spatial code image as a gray scale image from a second positive image and a second negative image projected to the first area by the first image projection device, the second positive image and the second negative image including a gray code pattern that has a luminance value varying in a vertical direction, creates a third spatial code image as a gray scale image from a third positive image and a third negative image projected to the second area by the second image projection device, the third positive image and the third negative image including a gray code pattern that has a luminance value varying in the horizontal direction, and creates a fourth spatial code image as a gray scale image from a fourth positive image and a fourth negative image projected to the second area by the second image projection device, the fourth positive image and the fourth negative image including a gray code pattern that has a luminance value varying in the vertical direction; a border coordinate acquirer that acquires a plurality of first border coordinates in the first spatial code image from a luminance distribution curve of the first positive image and the first negative image, acquires a plurality of second border coordinates in the second spatial code image from a luminance distribution curve of the second positive image and the second negative image, acquires a plurality of third border coordinates in the third spatial code image from a luminance distribution curve of the third positive image and the third negative image, and acquires a plurality of fourth border coordinates in the fourth spatial code image from a luminance distribution curve of the fourth positive image and the fourth negative image; an intersection coordinate acquirer that acquires first borderlines each connecting first border coordinates including the same code among the plurality of first border coordinates in the first spatial code image, second borderlines each connecting second border coordinates including the same code among the plurality of second border coordinates in the second spatial code image, third borderlines each connecting third border coordinates including the same code among the plurality of third border coordinates in the third spatial code image, and fourth borderlines each connecting fourth border coordinates including the same code among the plurality of fourth border coordinates in the fourth spatial code image; and synthesizes the first spatial code image and the second spatial code image and synthesizes the third spatial code image and the fourth spatial code image to acquire first intersection coordinates of the first borderlines and the second borderlines and second intersection coordinates of the third borderlines and the fourth borderlines; a second transform matrix calculator that transforms the first intersection coordinates and the second intersection coordinates by use of the first projection transform matrix, transforms the first intersection coordinates transformed by use of the first projection transform matrix into coordinates in a local coordinate system for the first image projection device, then calculates a second projection transform matrix usable to projection-transform the first intersection coordinates into intersection coordinates uniformly or substantially uniformly distributed in the first area, transforms the second intersection coordinates transformed by use of the first projection transform matrix into coordinates in a local coordinate system for the second image projection device, and then calculates a third projection transform matrix usable to projection-transform the second intersection coordinates into intersection coordinates uniformly or substantially uniformly distributed in the second area; a divided image generator that equally or substantially equally divides the large image to be projected to the image projection area into a first equally or substantially equally divided image and a second equally or substantially equally divided image along an equally or substantially equally dividing line, creates, as the first divided image to be output to the first projection device, a combination of the first equally or substantially equally divided image and a portion of the second equally or substantially equally divided image extending by a distance of a predetermined number of pixels from the equally or substantially equally dividing line, and creates, as the second divided image to be output to the second projection device, a combination of the second equally or substantially equally divided image and a portion of the first equally or substantially equally divided image extending by the distance of the predetermined number of pixels from the equally or substantially equally dividing line; and an image corrector that shifts an origin of the created first divided image and an origin of the created second divided image toward the equally or substantially equally dividing line by the distance of the predetermined number of pixels to perform a correction of deleting a gap between the first divided image and the second divided image, transforms image data on the first divided image by use of the second projection transform matrix, and transforms image data on the second divided image by use of the third projection transform matrix.

An image projection method according to another preferred embodiment of the present invention is an image projection method for projecting a first divided image to a first area of an image projection area using a first image projection device and projecting a second divided image to a second area, adjacent to the first area, of the image projection area using a second image projection device to project a large image including the first divided image and the second divided image to the image projection area. The image projection method includes capturing, with a lens of an image capturing device, an image of a first checker sheet including a checkered pattern including horizontal lines and vertical lines, the first checker sheet being placed on the image projection area; correcting a distortion, caused by the lens, of a first checker sheet image as an image of the first checker sheet captured by the image capturing device, the distortion being corrected by use of an inside parameter of the image capturing device; detecting checker intersection coordinates as intersection coordinates of the horizontal lines and the vertical lines in the post-correction first checker sheet image; calculating a first transform matrix usable to projection-transform the detected checker intersection coordinates into checker intersection coordinates uniformly or substantially uniformly distributed in the image projection area; creating a first spatial code image as a gray scale image from a first positive image and a first negative image projected to the first area by the first image projection device, the first positive image and the first negative image including a gray code pattern that has a luminance value varying in a horizontal direction, creating a second spatial code image as a gray scale image from a second positive image and a second negative image projected to the first area by the first image projection device, the second positive image and the second negative image including a gray code pattern that has a luminance value varying in a vertical direction, creating a third spatial code image as a gray scale image from a third positive image and a third negative image projected to the second area by the second image projection device, the third positive image and the third negative image including a gray code pattern that has a luminance value varying in the horizontal direction, and creating a fourth spatial code image as a gray scale image from a fourth positive image and a fourth negative image projected to the second area by the second image projection device, the fourth positive image and the fourth negative image including a gray code pattern that has a luminance value varying in the vertical direction; acquiring a plurality of first border coordinates in the first spatial code image from a luminance distribution curve of the first positive image and the first negative image, acquiring a plurality of second border coordinates in the second spatial code image from a luminance distribution curve of the second positive image and the second negative image, acquiring a plurality of third border coordinates in the third spatial code image from a luminance distribution curve of the third positive image and the third negative image, and acquiring a plurality of fourth border coordinates in the fourth spatial code image from a luminance distribution curve of the fourth positive image and the fourth negative image; acquiring first borderlines each connecting first border coordinates including the same code among the plurality of first border coordinates in the first spatial code image, second borderlines each connecting second border coordinates including the same code among the plurality of second border coordinates in the second spatial code image, third borderlines each connecting third border coordinates including the same code among the plurality of third border coordinates in the third spatial code image, and fourth borderlines each connecting fourth border coordinates including the same code among the plurality of fourth border coordinates in the fourth spatial code image; and synthesizing the first spatial code image and the second spatial code image and synthesizing the third spatial code image and the fourth spatial code image to acquire first intersection coordinates of the first borderlines and the second borderlines and second intersection coordinates of the third borderlines and the fourth borderlines; transforming the first intersection coordinates and the second intersection coordinates by use of the first projection transform matrix, transforming the first intersection coordinates transformed by use of the first projection transform matrix into coordinates in a local coordinate system for the first image projection device, then calculating a second projection transform matrix usable to projection-transform the first intersection coordinates into intersection coordinates uniformly or substantially uniformly distributed in the first area, transforming the second intersection coordinates transformed by use of the first projection transform matrix into coordinates in a local coordinate system for the second image projection device, and then calculating a third projection transform matrix usable to projection-transform the second intersection coordinates into intersection coordinates uniformly or substantially uniformly distributed in the second area; creating a first divided image to be output to the first image projection device and a second divided image to be output to the second image projection device; and transforming image data on the first divided image by use of the second projection transform matrix, transforming image data on the second divided image by use of the third projection transform matrix, and translating at least one of the first divided image and the second divided image toward a borderline between the first divided image and the second divided image to delete a gap between the first divided image and the second divided image.

An image projection method according to a further preferred embodiment of the present invention is an image projection method for projecting a first divided image to a first area of an image projection area using a first image projection device and projecting a second divided image to a second area, adjacent to the first area, of the image projection area using a second image projection device to project a large image including the first divided image and the second divided image to the image projection area. The image projection method includes capturing, with a lens of an image capturing device, an image of a first checker sheet including a checkered pattern including horizontal lines and vertical lines, the first checker sheet being placed on the image projection area; correcting a distortion, caused by the lens, of a first checker sheet image as an image of the first checker sheet captured by the image capturing device, the distortion being corrected by use of an inside parameter of the image capturing device; detecting checker intersection coordinates as intersection coordinates of the horizontal lines and the vertical lines in the post-correction first checker sheet image; calculating a first transform matrix usable to projection-transform the detected checker intersection coordinates into checker intersection coordinates uniformly or substantially uniformly distributed in the image projection area; creating a first spatial code image as a gray scale image from a first positive image and a first negative image projected to the first area by the first image projection device, the first positive image and the first negative image including a gray code pattern that has a luminance value varying in a horizontal direction, creating a second spatial code image as a gray scale image from a second positive image and a second negative image projected to the first area by the first image projection device, the second positive image and the second negative image including a gray code pattern that has a luminance value varying in a vertical direction, creating a third spatial code image as a gray scale image from a third positive image and a third negative image projected to the second area by the second image projection device, the third positive image and the third negative image including a gray code pattern that has a luminance value varying in the horizontal direction, and creating a fourth spatial code image as a gray scale image from a fourth positive image and a fourth negative image projected to the second area by the second image projection device, the fourth positive image and the fourth negative image including a gray code pattern that has a luminance value varying in the vertical direction; acquiring a plurality of first border coordinates in the first spatial code image from a luminance distribution curve of the first positive image and the first negative image, acquiring a plurality of second border coordinates in the second spatial code image from a luminance distribution curve of the second positive image and the second negative image, acquiring a plurality of third border coordinates in the third spatial code image from a luminance distribution curve of the third positive image and the third negative image, and acquiring a plurality of fourth border coordinates in the fourth spatial code image from a luminance distribution curve of the fourth positive image and the fourth negative image; acquiring first borderlines each connecting first border coordinates including the same code among the plurality of first border coordinates in the first spatial code image, second borderlines each connecting second border coordinates including the same code among the plurality of second border coordinates in the second spatial code image, third borderlines each connecting third border coordinates including the same code among the plurality of third border coordinates in the third spatial code image, and fourth borderlines each connecting fourth border coordinates including the same code among the plurality of fourth border coordinates in the fourth spatial code image; and synthesizing the first spatial code image and the second spatial code image and synthesizing the third spatial code image and the fourth spatial code image to acquire first intersection coordinates of the first borderlines and the second borderlines and second intersection coordinates of the third borderlines and the fourth borderlines; transforming the first intersection coordinates and the second intersection coordinates by use of the first projection transform matrix, transforming the first intersection coordinates transformed by use of the first projection transform matrix into coordinates in a local coordinate system for the first image projection device, then calculating a second projection transform matrix usable to projection-transform the first intersection coordinates into intersection coordinates uniformly or substantially uniformly distributed in the first area, transforming the second intersection coordinates transformed by use of the first projection transform matrix into coordinates in a local coordinate system for the second image projection device, and then calculating a third projection transform matrix usable to projection-transform the second intersection coordinates into intersection coordinates uniformly or substantially uniformly distributed in the second area; equally or substantially equally dividing the large image to be projected to the image projection area into a first equally or substantially equally divided image and a second equally or substantially equally divided image along an equally or substantially equally dividing line, creating, as the first divided image to be output to the first projection device, a combination of the first equally or substantially equally divided image and a portion of the second equally or substantially equally divided image extending by a distance of a predetermined number of pixels from the equally or substantially equally dividing line, and creating, as the second divided image to be output to the second projection device, a combination of the second equally or substantially equally divided image and a portion of the first equally or substantially equally divided image extending by the distance of the predetermined number of pixels from the equally or substantially equally dividing line; and shifting an origin of the created first divided image and an origin of the created second divided image toward the equally or substantially equally dividing line by the distance of the predetermined number of pixels to perform a correction of deleting a gap between the first divided image and the second divided image, transforming image data on the first divided image by use of the second projection transform matrix, and transforming image data on the second divided image by use of the third projection transform matrix.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7A shows 8-bit positive images and negative images including a gray code pattern extending in a vertical direction.

FIG. 7B shows binary images acquired from the positive images and the negative images shown in FIG. 7A.

FIG. 7C shows a spatial code image having a code value varying in a horizontal direction, the spatial code image being acquired from the eight binary images shown in FIG. 7B.

FIG. 8A shows 8-bit positive images and negative images including a gray code pattern extending in the horizontal direction.

FIG. 8B shows binary images acquired from the positive images and the negative images shown in FIG. 8A.

FIG. 8C shows a spatial code image having a code value varying in the vertical direction, the spatial code image being acquired from the eight binary images shown in FIG. 8B.

FIG. 11 shows intersections of borderlines in a spatial code image having a code value varying in the horizontal direction and borderlines in a spatial code image having a code value varying in the vertical direction.

FIG. 19A shows divided images in an image created by dividing a three-dimensional printing object into a plurality of layers, the divided images being to be output to the projectors.

FIG. 19B shows a procedure of correcting the divided image to be output to the first projector.

FIG. 19C shows a procedure of correcting the divided image to be output to the second projector.

DETAILED DESCRIPTION OF THE PREFERRED EMBODIMENTS

Hereinafter, examples of preferred embodiments of an image projection system and an image projection method according to the present invention will be described.

Figure 1:
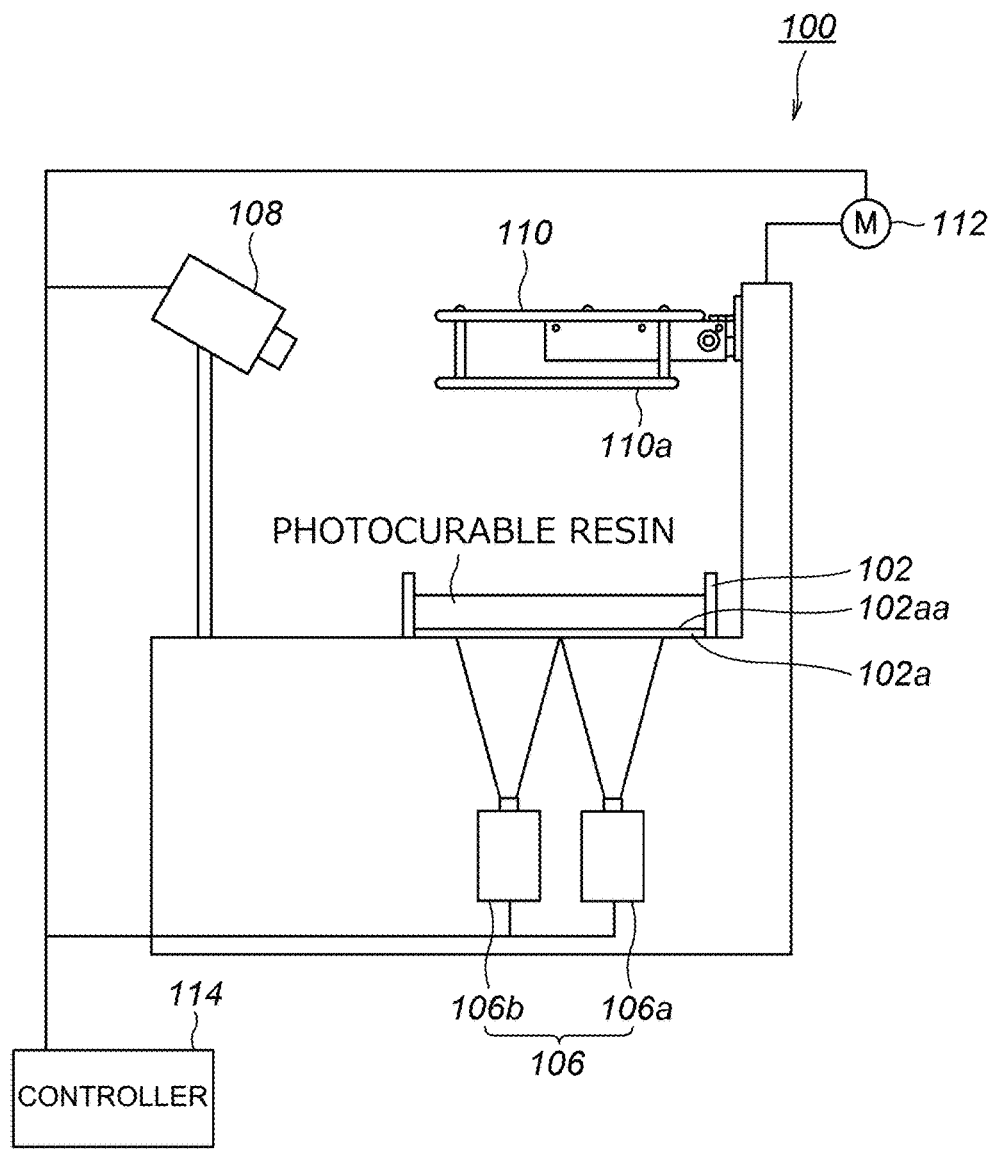
FIG. 1 is a schematic view showing a structure of an optical printing device including an image projection system according to a preferred embodiment of the present invention.

As shown in FIG. 1, an optical printing device 100 according to a preferred embodiment of the present invention includes a container 102 that accommodates a photocurable resin, projectors (image projection devices) 106 each of which projects an image to a bottom plane 102a of the container 102, a camera (image capturing device) 108 located at a position at which the camera 108 is able to capture an image of the projected image, a printing object holder 110 that holds the photocurable resin cured in the container 102, a driver 112 that moves the printing object holder 110 in an up-down direction, and a controller 114 that controls the camera 108 that captures an image of an image projection area, the projectors 106 and the driver 112.

The bottom plane 102a of the container 102 includes a light-transmissive plate. The container 102 accommodates a photocurable resin in a liquid state, which is cured by being irradiated with light such as visible light, ultraviolet light or the like. Images projected by the projectors 106 are projected to an interface between the photocurable resin and the bottom plane 102a in the container 102, the interface acting as an image projection surface.

Figure 17:
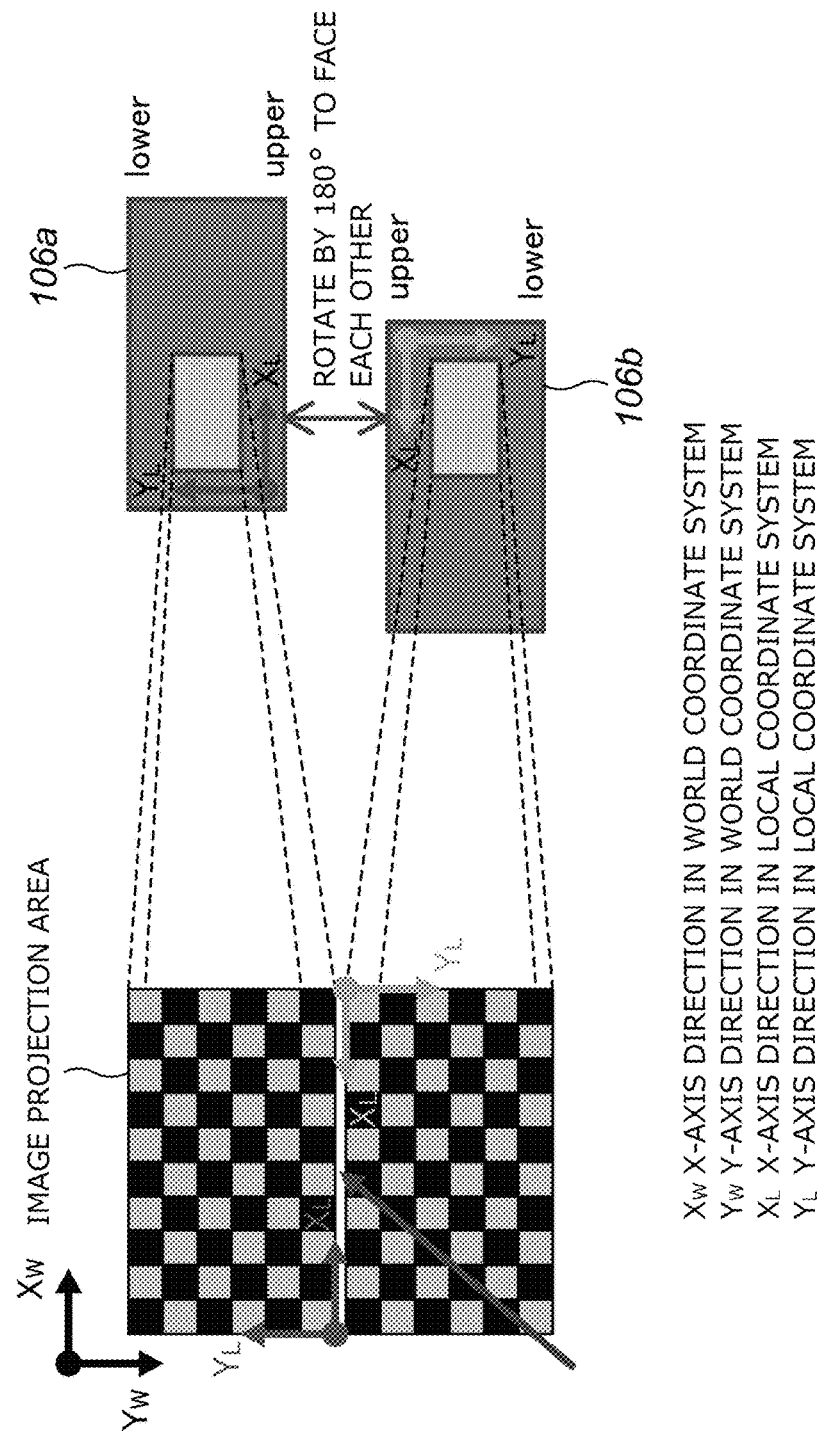
FIG. 17 shows a state where a checker sheet image after being projection-transformed is projected to an image projection area by two projectors.

The projectors 106 project images output from the controller 114 to an image projection area of the image projection surface. The images are projected from below the container 102. The projectors 106 sequentially project a plurality of images showing cross-sections of a three-dimensional printing object to be produced. The images are obtained as a result of dividing the three-dimensional printing object in a horizontal direction. The plurality of cross-sectional images will be referred to as "slice images", hereinafter. The projectors 106 include a projector 106a and a projector 106b preferably including the same structure and the same specifications. The projector 106a and the projector 106b are located at positions and postures that are adjusted such that images are able to be projected to predetermined areas of the image projection area. The projector 106a and the projector 106b are located so as to face each other in the state where one of the projector 106a and the projector 106b is rotated at 180 degrees with respect to the other of the projector 106a and the projector 106b (see FIG. 17). The projector 106a projects a first divided image to a first area of the image projection area, whereas the projector 106b projects a second divided image to a second area of the image projection area. The first divided image and the second divided image define a large image to be projected on the image projection area. The divided images to be projected by the projector 106a and the projector 106b are created by a divided image generator 54 described later.

The camera 108 captures an image of the container 102 from above. The camera 108 is located at a position and a posture at which the camera 108 is able to capture an image of the entirety of the image projection area. The image projection area is a printing area in which a three-dimensional printing object is printed.

The printing object holder 110 holds a three-dimensional printing object in the state where a bottom surface 110a thereof is in close contact with the photocurable resin cured in the container 102. A portion of the printing object holder 110 that is to be in close contact with the photocurable resin is preferably made of a metal material, for example, aluminum, stainless steel or the like. The surface of the printing object holder 110 that is to be in close contact with the photocurable resin is, for example, sandblasted to be a rough surface including minute concaved and convexed portions.

The controller 114 stores the areas where the projector 106a and the projector 106b are to project the divided images. The controller 114 creates and stores image data on the divided images that are to be output to the projectors 106a and 106b based on image data on slice images of the plurality of layers obtained as a result of dividing the three-dimensional printing object. The image data to be output to the projector 106a and the image data to be output to the projector 106b are stored as being associated to each other. Specifically, the image data on the divided image to be projected by the projector 106a and the image data on the divided image to be projected by the projector 106b, which define one large image together, are associated to each other. The controller 114 outputs the image data on the two divided images to the projector 106a and the projector 106b at the same timing at a certain time interval. The controller 114 sequentially outputs the divided images of the plurality of slice images to the projectors 106a and 106b. The controller 114 also drives the driver 112 at a certain time interval to raise the printing object holder 110 by a predetermined distance. The controller 114 performs a calculation process to calculate a translation matrix and a projection transform matrix described later in detail. The calculation process is performed to calculate a matrix required to correct the image data such that the images are properly projected to the first area and the second area of the image projection area by the projectors 106a and 106b regardless of the position or the posture of each of the projectors 106a and 106b.

Figure 2:
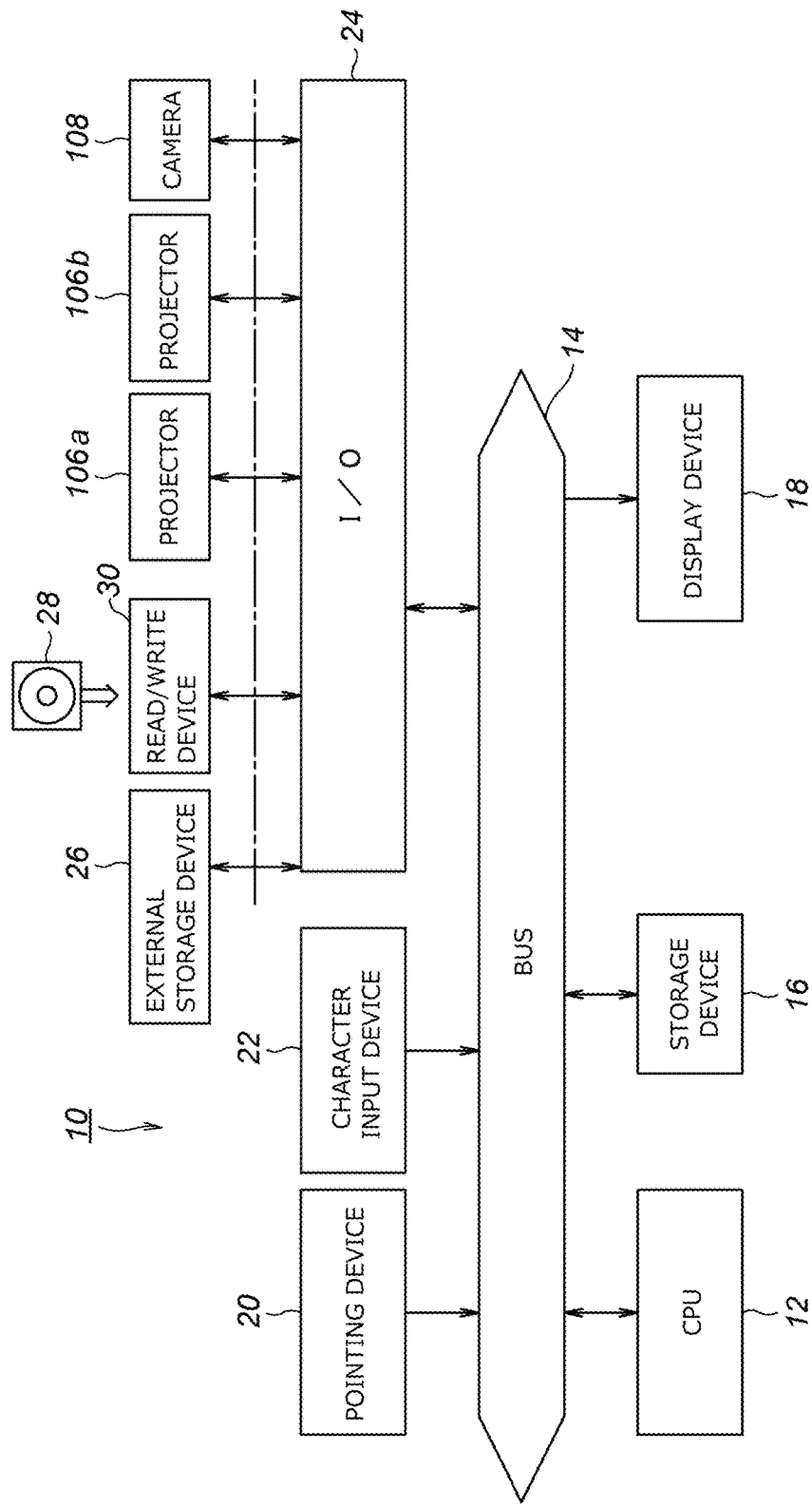
FIG. 2 is a block diagram showing a hardware structure of the image projection system according to a preferred embodiment of the present invention.

The optical printing device 100 includes the projectors 106a and 106b, the camera 108, and the controller 114. As shown in FIG. 2, the controller 114 may be realized by a CPU (central processing unit) 12 provided in, for example, a known personal computer or general-purpose computer. The CPU 12 is connected to a storage device 16 including a read only memory (ROM), a random access memory (RAM) and the like, to a display device 18, to a pointing device 20, to a character input device 22, and to an input/output interface circuit (I/O) 24 via a bus 14. The read only memory stores, for example, programs and various types of data usable to control the CPU 12. The random access memory includes, for example, a storage area usable as a working area for the CPU 12. The storage device 16 stores, beforehand, programs usable to execute a calculation process to calculate the projection transform matrix and the translation matrix described later as well as various types of data usable to perform such a process. The display device 18 includes a screen such as a CRT, a liquid crystal panel or the like that provides various types of displays under the control of the CPU 12. The pointing device 20 includes a mouse or the like that is an input device usable to designate an arbitrary position on the display screen of the display device 18. The character input device 22 includes a keyboard or the like that is an input device usable to input an arbitrary character. The input/output interface circuit (I/O) 24 mediates communication with an external device. The input/output interface circuit (I/O) 24 is connected to the projectors 106a and 106b, the camera 108, an external storage device 26 such as a hard disc or the like, and a read/write device 30. The read/write device 30 writes and stores various types of data created under the control of the CPU 12 onto a computer-readable storage medium 28 such as a compact disc (CD), a digital versatile disc (DVD) or the like. The CPU 12 reads the various types of data stored on the storage medium 18. The programs and the various types of data usable to calculate the projection transform matrix and the translation matrix may be read to the random access memory of the storage device 16 from an external device. The image data on the divided images to be output to the projectors 106a and 106b is created by a personal computer separately provided and stored in the storage device 16.

Figure 3:
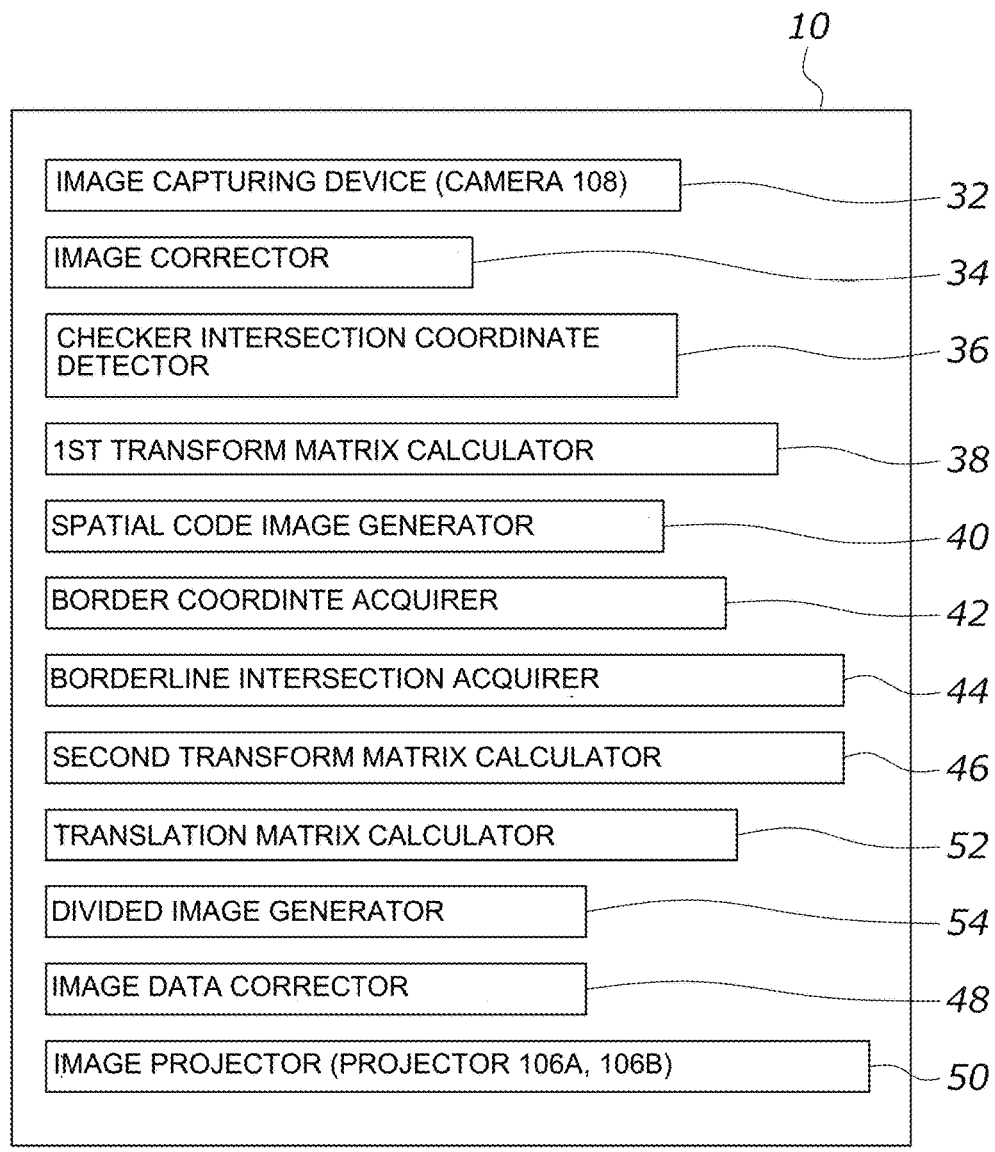
FIG. 3 is a block diagram showing a functional structure of the image projection system according to a preferred embodiment of the present invention.

Now, the image projection system 10 will be described in detail. As shown in FIG. 3, the image projection system 10 includes an image capturing device 32 (i.e., camera 108), an image corrector 34, a checker intersection coordinate detector 36, a first transform matrix calculator 38, a spatial code image generator 40, a border coordinate acquirer 42, a borderline intersection acquirer 44, a second transform matrix calculator 46, an image data corrector 48, an image projector 50 (i.e., projector 106a, 106b), a translation matrix calculator 52, and a divided image generator 54. The image capturing device 32 captures an image of the entirety of the image projection area on the bottom plane 102a of the container 102. After the image capturing device 32 captures an image of a checker sheet placed by an operator on a top surface 102aa of the bottom plane 102a of the container 102, the image corrector 34 corrects the captured image of the checker sheet by use of an inside parameter of the camera 108. The checker sheet is projection-light-transmissive and includes, for example, a sheet of paper with a checkered pattern printed thereon. The checker intersection coordinate detector 36 detects checker intersection coordinates in the corrected checker sheet image at a sub pixel precision. The term "checker intersections" refers to intersections of vertical lines and horizontal lines in a checkered pattern. The first transform matrix calculator 38 calculates a projection transform matrix H1 usable to transform the detected checker intersection coordinates into coordinates in a known coordinate system of the image projection area. The spatial code image generator 40 creates a spatial code image having a code value varying in a vertical direction and a spatial code image having a code value varying in a horizontal direction. The border coordinate acquirer 42 acquires, at a sub pixel precision, border coordinates having a gray scale value in the spatial code images. The borderline intersection acquirer 44 acquires borderlines between adjacent gray scale values in each of the spatial code images, and synthesizes the spatial code image having a code value varying in the vertical direction and the spatial code image having a code value varying in the horizontal direction to acquire intersections of the borderlines for each of the projector 106a and the projector 106b. The second transform matrix calculator 46 calculates a projection transform matrix H2 usable to perform a transformation such that acquired intersection coordinates for the projector 106a are uniformly or substantially uniformly distributed in the first area and another projection transform matrix H2 usable to perform a transformation such that the acquired intersection coordinates for the projector 106b are uniformly or substantially uniformly distributed in the second area. The translation matrix calculator 52 calculates a translation matrix T usable to translate the first divided image and the second divided image in a predetermined direction in order to delete a gap between the first divided image and the second divided image. The gap is caused after image data on the first divided image is transformed by use of the projection transform matrix H2 and image data on the second divided image is transformed by use of the projection transform matrix H2. The gap is caused between the post-transform first divided image and the post-transform second divided image. The divided image generator 54 creates images to be output to the projector 106a and the projector 106b for each of the plurality of slice images stored beforehand. The image data corrector 48 corrects the image data on the images to be projected by the image projector 50 by use of the calculated by the projection transform matrices H2 and translation matrix T. The image projector 50 projects the images to the predetermined areas in the image projection area based on the corrected image data. The functions of the above-described devices and elements will be described later in detail.

Now, a non-limiting example of a method for projecting an image by use of the image projection system 10 will be described. In an example described below, the camera and the like have the following specifications, for example. The specifications are not limited to those described below, and may be changed when necessary.

Camera: ARTCAM-130MI-BI produced by ARTRAY Co., Ltd. (number of pixels: 1280×1024 pixels; B/W)

Camera lens: produced by Computar; compatible to mega pixels; f=12 mm

Projector: capable of projecting an image of 1366×768 pixels uses 1366×768 pixels as the size of an input image Checker sheet:

A checkered pattern (i.e., printing area) is designed with a size conformed to the length/width ratio of 1366×1536 pixels, which is an area size in the case where two projectors having a resolution of 1366×768 pixels are arranged in a line in the vertical direction.

The entire size is 121×136.1 mm (in the case where the set value in the horizontal direction is 121 mm, the size in the vertical direction is 121×1536/1366; this value is rounded off to one decimal place to obtain 136.1, which is the value in the vertical direction).

The checkered pattern is located over the entire checker sheet such that 12 squares are accommodated in the size in the vertical direction.

The entire size is adapted to the printing area (i.e., image projection area) of the optical printing device.

The checkered pattern is printed on paper or the like that is projection-light-transmissive.

A camera calibration is performed for the image projection system 10 at a predetermined timing, for example, at the time of shipment of the image projection system 10 from the plant or at the time of adjustment performed on the projectors 106a and 106b. The inside parameter of the camera 108 acquired by the camera calibration is stored in the storage device 16. The camera calibration is performed by use of an LCD (liquid crystal display) independently from the image projection system 10. The camera 108 is installed in the optical printing device 100 after the camera calibration is finished. The camera calibration will be described more specifically. In the camera calibration, an image of a checkered pattern is captured in the entirety of the angle of view of the camera 108, and camera parameters are calculated by use of the Zhang technique. Used as the checkered pattern is not the checkered pattern drawn on the checker sheet to be placed on the top surface 102aa of the bottom plane 102a of the container 102, but is a checkered pattern displayed on the LCD. Usable as the LCD is, for example, SAMSUNG B2430 (number of pixels: 1920×1080; dot pitch: 0.2768 mm). A checkered pattern including 12×10 squares each having a size of 11.9024 mm×11.9024 mm is displayed on the LCD. Images of the checkered pattern are captured in five different directions by the camera 108 located at a position at which a tip of the camera 108 is about 300 mm away from the surface of the LCD. For calculating the camera parameters by use of the Zhang technique, a method disclosed in, for example, Japanese Laid-Open Patent Publication No. 2007-309660 is usable.

Only the inside parameter of the camera including lens distortion coefficients is used from the following expressions (1) and (2) calculated by use of the Zhang technique.

Expression 1

$$s\tilde{m} = A[\begin{matrix} R & T \end{matrix}]\tilde{M} \qquad (1)$$

Expression 2

$$\begin{cases} \breve{u} = u + (u - u_0)[k_1(x^2 + y^2) + k_2(x^2 + y^2)^2] \\ \breve{v} = v + (v - v_0)[k_1(x^2 + y^2) + k_2(x^2 + y^2)^2] \end{cases} \qquad (2)$$

In the above expression (1), "A" is the inside parameter of the camera 108, "R" is a rotation matrix for the camera 108, "T" is a translation vector, and "[RT]" is an outside parameter of the camera 108. In the above expression (2), "ud" and "vd" are coordinate values in the post-distortion image, "u0" and "v0" are coordinate values of the center of the image, and "k1" and "k2" are distortion coefficients.

In the state where the inside parameter of the camera 108 is stored in the storage device 16, the operator places the checker sheet on the top surface 102aa of the bottom plane 102a of the container 102. In the state where the checker sheet is placed in the container 102, an image of the checker sheet is captured by the camera 108. The captured checker sheet image is stored in the storage device 16.

After this, the operator instructs a start of calculation of the transform matrices by use of the pointing device 20 or the character input device 22, and then a transform matrix calculation process is started by the image projection system 10.

Figure 4:
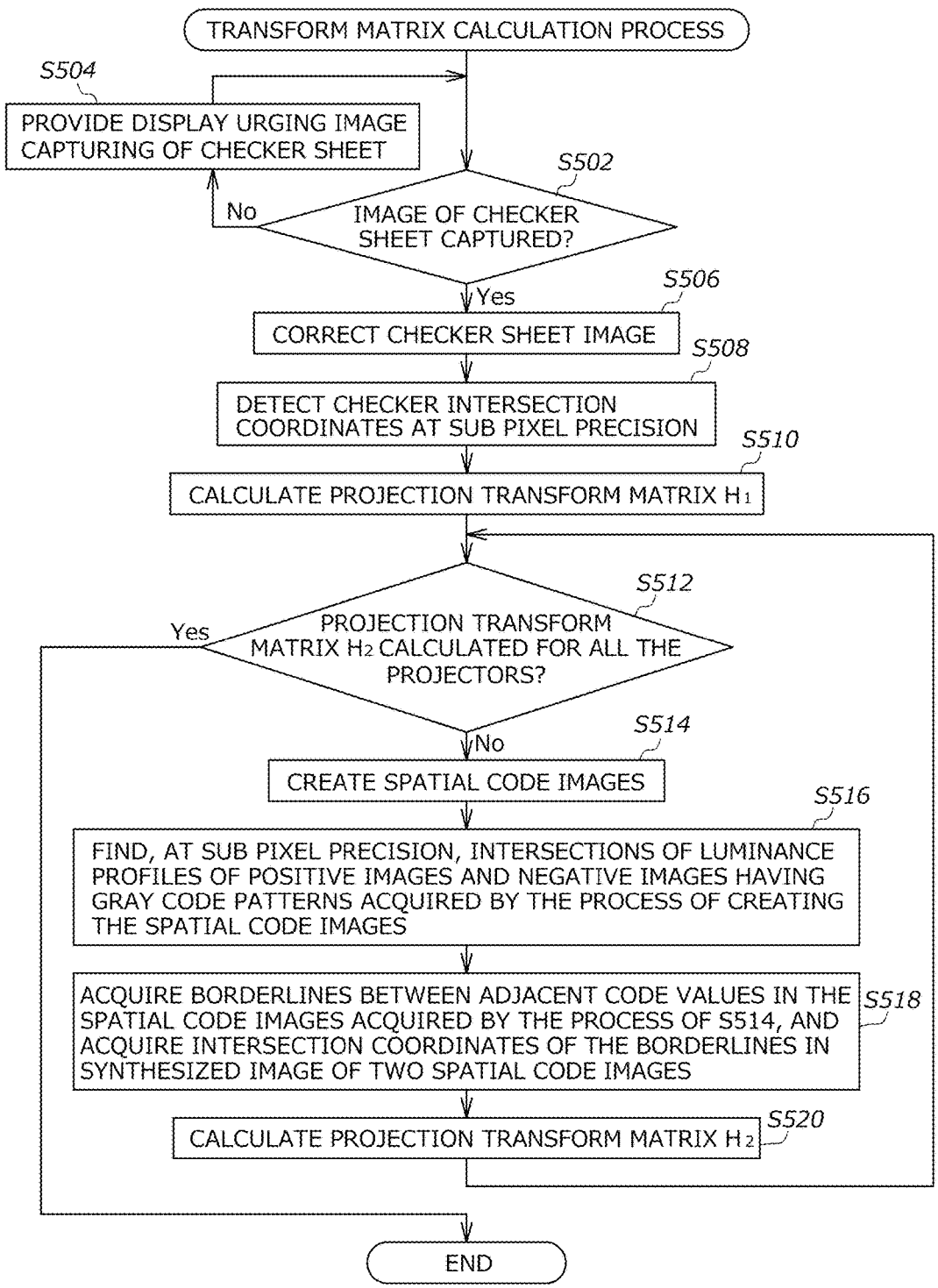
FIG. 4 is a flowchart showing a routine of a transform matrix calculation process to be performed by the image projection system according to a preferred embodiment of the present invention.

Referring to FIG. 4, at the start of the transform matrix calculation process, first, it is determined whether or not an image of the checker sheet has been captured (step S502). More specifically, it is determined whether or not a checker sheet image is stored in the storage device 16. The checker sheet image is erased at the end of the transform matrix calculation process. The checker sheet image stored in the storage device 16 on this stage is different from a checker sheet image stored beforehand that is used in a translation matrix calculation process described later. When it is determined that no checker sheet image is stored in the storage device 16 (No in step S502), display that urges image capturing of the checker sheet is provided on the display device 18 (step S504), and the operation returns to step S502.

By contrast, when it is determined that a checker sheet image is stored in the storage device 16 (Yes in step S502), a distortion of the checker sheet image caused by the lens is corrected by the image corrector 34 by use of the inside parameter of the camera 108 (step S506).

Figure 5:
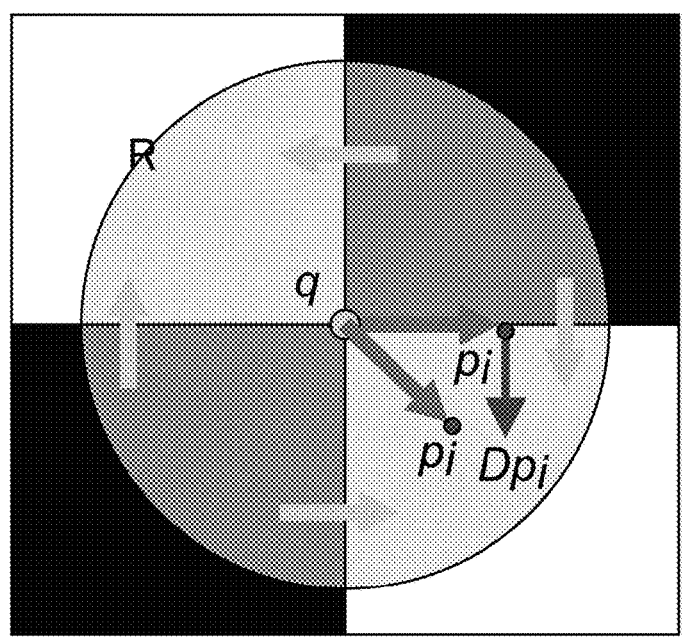
FIG. 5 shows a method for performing a sub pixel estimation of checker intersections.

Next, checker intersection coordinates in the corrected checker sheet image are detected by the checker intersection coordinate detector 36 at a sub pixel precision (step S508). For the detection, a sub pixel estimation method is executed. As shown in FIG. 5, at a border between squares in the checkered pattern, vector pi-q and luminance gradient vector Dpi are perpendicular or substantially perpendicular to each other, and the inner product ∈i thereof is 0. "q" is the center coordinate at the sub pixel precision at which the checker intersection coordinates are to be detected, "pi" is a coordinate of each of points in a circular field of view R, and "Dpi" is the luminance gradient vector at pi. In the case where q is a true intersection, the total sum of the inner products ∈i is closest to 0. In the case where q is a point that is not a true intersection, the inner product ∈i is larger than 0, and the total sum of the inner products ∈i is also larger than 0. Thus, a sub pixel coordinate q at which the sum of squares of all the inner products ∈i is minimum is calculated by the following expression by use of the Levenberg-Marquardt algorithm.

$$\sum_i \varepsilon_i^2 = \sum_i (Dp_i^T \cdot (p_i - q))^2 \qquad \text{Expression 3}$$

Figure 6:
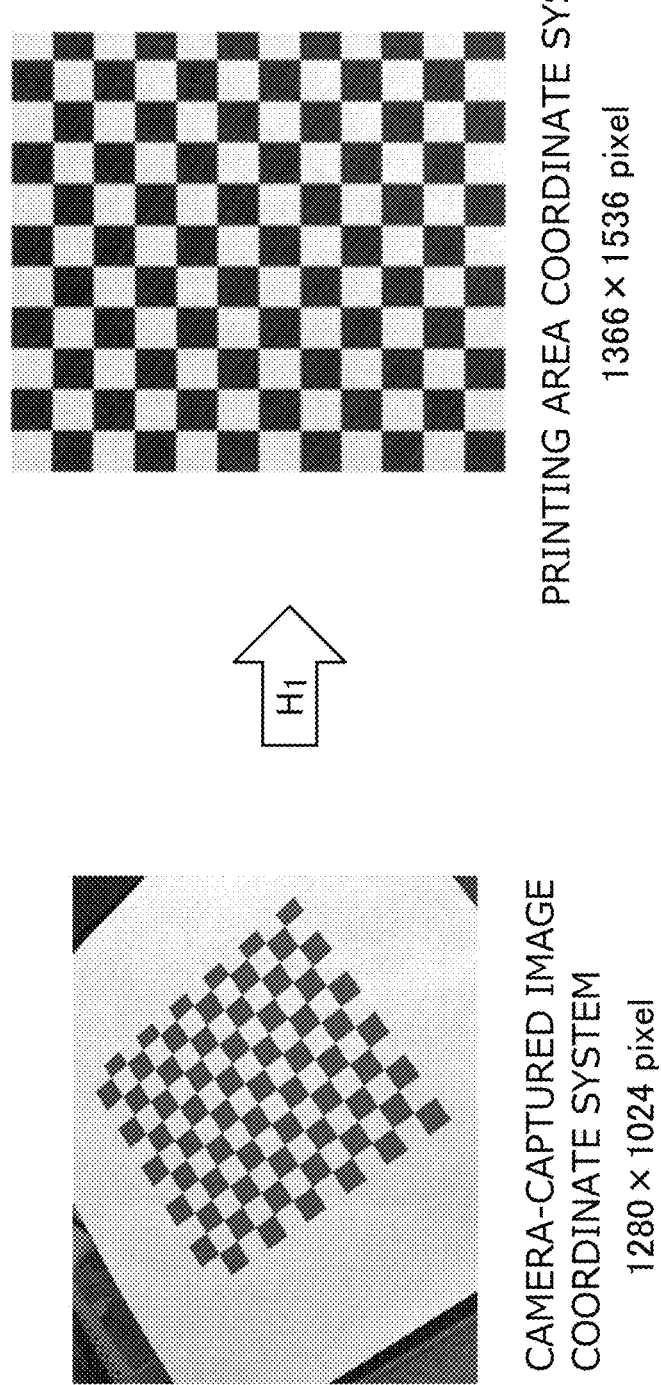
FIG. 6 shows that checker intersections in a checker sheet are transformed from coordinates in a camera-captured image coordinate system into coordinates in a printing area coordinate system.

Then, the projection transform matrix H1 is calculated by the first transform matrix calculator 38 (step S510). Checker intersection coordinates acquired by capturing an image of the checker sheet, located in an image capturing area, from an appropriate position are stored in the storage device 16 beforehand. The checker intersection coordinates are located at an equal interval in the image capturing area. As shown in FIG. 6, the projection transform matrix H1 is used to transform checker intersection coordinates in a camera-captured image coordinate system into the checker intersection coordinates stored in the storage device 16, in other words, checker intersection coordinates in a coordinate system of the printing area, which is the image projection area. The "appropriate position" is, for example, a position at which the checker sheet is located in the entirety of the angle of view of the camera 108 and the line of sight of the camera and the checker sheet are perpendicular or substantially perpendicular to each other.

The projection transform matrix H1 is calculated by the following method. Calculated as the projection transform matrix H1 is a projection transform matrix H usable to transform image coordinates (xs, ys) of a source (corresponding to the checker intersection coordinates detected by the process of step S508) into image coordinates (xt, yt) of a target (corresponding to the checker intersection coordinate stored in the storage device 16).

Expression 4

$$s\begin{bmatrix} x_t \\ y_t \\ 1 \end{bmatrix} = H \begin{bmatrix} x_s \\ y_s \\ 1 \end{bmatrix}, \qquad (3)$$

$$H = \begin{bmatrix} h_{11} & h_{12} & h_{13} \\ h_{21} & h_{22} & h_{23} \\ h_{31} & h_{32} & h_{33} \end{bmatrix}$$

n sets of image coordinate values before and after the transform are substituted into the above expression (3).

$$\begin{cases} sx_{tn} = h_{11}x_{sn} + h_{12}y_{sn} + h_{13} \\ sy_{tn} = h_{21}x_{sn} + h_{22}y_{sn} + h_{23} \\ s = h_{31}x_{sn} + h_{32}y_{sn} + h_{33} \end{cases} \qquad \text{Expression 5}$$

$$\begin{cases} h_{11}x_{sn} + h_{12}y_{sn} + h_{13} - h_{31}x_{sn}x_{tn} - h_{32}y_{sn}x_{tn} - h_{33}x_{tn} = 0 \\ h_{21}x_{sn} + h_{22}y_{sn} + h_{23} - h_{31}x_{sn}y_{tn} - h_{32}y_{sn}y_{tn} - h_{33}y_{tn} = 0 \end{cases} \qquad \text{Expression 6}$$

-continued $$\begin{bmatrix} x_{s1} & y_{s1} & 1 & 0 & 0 & 0 & -x_{s1}x_{t1} & -y_{s1}x_{t1} & -x_{t1} \\ 0 & 0 & 0 & x_{s1} & y_{s1} & 1 & -x_{s1}y_{t1} & -y_{s1}y_{t1} & -y_{t1} \\ & & & & \vdots & & & & \\ x_{sn} & y_{sn} & 1 & 0 & 0 & 0 & -x_{sn}x_{tn} & -y_{sn}x_{tn} & -x_{tn} \\ 0 & 0 & 0 & x_{sn} & y_{sn} & 1 & -x_{sn}y_{tn} & -y_{sn}y_{tn} & -y_{tn} \end{bmatrix}$$

Expression 7

$$\begin{bmatrix} h_{11} \\ h_{12} \\ \vdots \\ h_{32} \\ h_{33} \end{bmatrix} = \begin{bmatrix} 0 \\ 0 \\ \vdots \\ 0 \\ 0 \end{bmatrix}$$

where B·h=0, h is determined as the right singular vector corresponding to the smallest singular value of B or as the eigenvector corresponding to the smallest eigenvalue of $B^TB$ (for example, by use of OpenCV 2.x, SVD::solveZ ( ) function).

For such a method, a conventionally known technology is usable (see, for example, Gang Xu, "Shashin kara tsukuru 3-jigen CG" (3D CG from Photographs) published by Kindai Kagaku Sha Co., Ltd.). Herein, a detailed description thereof will not be provided.

After the projection transform matrix H1 is calculated, it is determined whether or not the projection transform matrix H2 has been calculated for all the projectors (step S512). More specifically, it is determined whether or not the projection transform matrix H2 for each of all the projectors is stored in the storage device 16. The projection transform matrix H2 is unique for each projector. In the following description, a method for calculating the projection transform matrix H2 for the projector 106a will be provided. The method for calculating the projection transform matrix H2 for the projector 106b is substantially the same as that for the projector 106a.

When it is determined that the projection transform matrix H2 for a particular projector is not stored in the storage device 16 (No in step S512), a spatial code image for the projector is created (step S514). More specifically, either the projector 106a or the projector 106b is selected, the projection transform matrix H2 for the selected projector is calculated, and a gray code pattern is projected by the selected projector to create the spatial code image. The projector may be selected as follows, for example. The projectors respectively have serial numbers assigned thereto, and a projector having a smallest number is selected.

First, 8-bit gray code patterns are projected to the bottom plane 102a of the container 102 by the projector 106a. Images of the projected gray code patterns are captured by the camera 108, and a spatial code image is created from each of the captured images. The gray code patterns to be projected by the projector 106a are stored in the storage device 106a beforehand, and data on the 8-bit gray code patterns is sequentially output to the projector 106a at predetermined timings.

This will be described in detail. Positive images and negative images that are stored in the storage device 16 beforehand and have gray code patterns extending in the vertical direction are sequentially output to the projector 106a by the spatial code image generator 40. Then, as shown in FIG. 7A, the positive image and the negative image of each gray code patterns extending in the vertical direction of each bit are projected by the projector 106a to the bottom plane 102a of the container 102. The projected images of the gray code patterns are each captured by the camera 108. The captured positive images and negative images of the gray code patterns extending in the vertical direction are output to the spatial code image generator 40. The spatial code image generator 40 performs a lens distortion correction on these images by use of the inside parameter of the camera 108. As shown in FIG. 7B, the spatial code image generator 40 creates a binary image based on a luminance difference between the positive image and the negative image of the same bit. As shown in FIG. 7C, the spatial code image generator 40 creates a spatial code image having a code value varying in the horizontal direction from the 8-bits binary images. The "spatial code image having a code value varying in the horizontal direction" is a gray scale image having a luminance value varying from 0 to 255 in the horizontal direction.

Figure 9A:
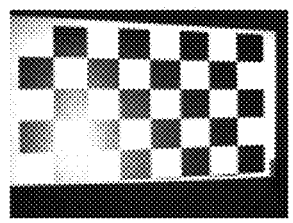
FIG. 9A shows an image of full projection.
Figure 9B:
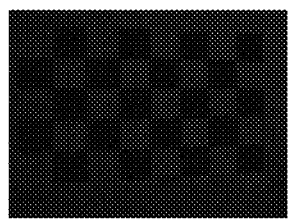
FIG. 9B shows an image of full extinction.
Figure 9C:
FIG. 9C shows a masked image created from the image of full projection shown in FIG. 9A and the image of full extinction shown in FIG. 9B.

Next, positive images and negative images that are stored in the storage device 16 beforehand and have gray code patterns extending in the horizontal direction are sequentially output to the projector 106a by the spatial code image generator 40. Then, as shown in FIG. 8A, the positive image and the negative image of the gray code pattern extending in the horizontal direction of each bit are projected to the bottom plane 102a of the container 102 by the projector 106a. The projected images of the gray code patterns are each captured by the camera 108. The captured positive images and negative images of the gray code patterns extending in the horizontal direction are output to the spatial code image generator 40. The spatial code image generator 40 performs a lens distortion correction on these images by use of the inside parameter of the camera 108. As shown in FIG. 8B, the spatial code image generator 40 creates a binary image based on a luminance difference between the positive image and the negative image of the same bit. As shown in FIG. 8C, the spatial code image generator 40 creates a spatial code image having a code value varying in the vertical direction from the 8-bits binary images. The "spatial code image having a code value varying in the vertical direction" is a gray scale image having a luminance value varying from 0 to 255 in the vertical direction. For creating the spatial code images, in order to mask pixels to which the images are not to be projected by the projector 106a, the following is performed. An image of full projection (image obtained in the state where the entire first area of the image projection area is illuminated with light output from the projector 106a; see FIG. 9A), and an image of full extinction (image obtained in the state where no portion of the first area of the image projection area is illuminated with light output from the projector 106a; see FIG. 9B), are created, and a masked image in which a smaller pixel value, among each pair of pixels at corresponding positions in the two images, is made 0 (see FIG. 9C) is created.

Figure 10:
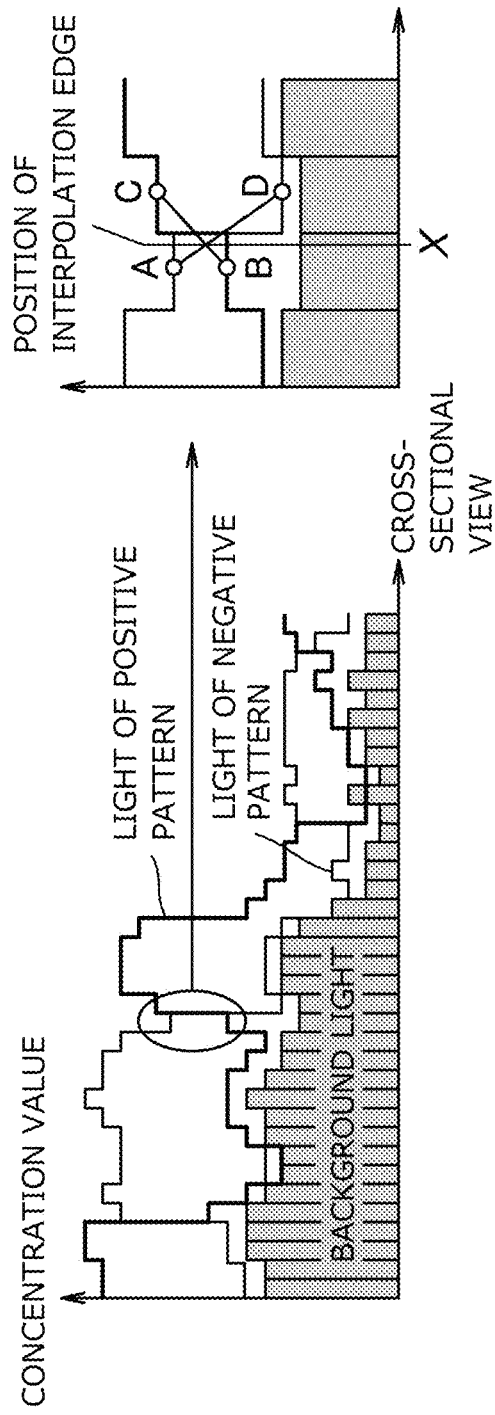
FIG. 10 shows how to acquire border coordinates at a sub pixel precision based on intersections in luminance profiles.

Next, intersections in luminance profiles (luminance distribution curves) of the acquired positive images and negative images of the gray code patterns are determined at a sub pixel precision (step S516). This will be described more specifically. As shown in FIG. 10, the intersections in the luminance profiles in the positive image and the negative image of the gray code pattern extending in the vertical direction of each same bit are determined by the border coordinate acquirer 42 at a sub pixel precision. These intersections represent the border coordinates, at the sub pixel precision, of the code values varied in the horizontal direction in the spatial code image. Similarly, the intersections in the luminance profiles in the positive image and the negative image of the gray code pattern extending in the horizontal direction of each same bit are determined by the border coordinate acquirer 42 at a sub pixel precision. This intersections represent the border coordinates, at the sub pixel precision, of the code values varied in the vertical direction in the spatial code image. As a method for calculating border coordinates, at a sub pixel precision, of code values in such a spatial code image, a conventionally known technology is usable (see, for example, Kosuke SATO and Seiji INOKUCHI, "Sanjigen Gazo Keisoku" (Three-dimensional Image Measurement) published by Shokodo Co., Ltd.). Herein, a detailed description thereof will not be provided.

Next, borderlines each connecting the border coordinates including the same code value are acquired in each of the spatial code image having the code value varying in the horizontal direction and the spatial code image having the code value varying in the vertical direction. Then, the spatial code image having the code value varying in the horizontal direction and the spatial code image having the code value varying in the vertical direction are synthesized. After this, intersection coordinates of the borderlines in the spatial code image having the code value varying in the horizontal direction and the borderlines in the spatial code image having the code value varying in the vertical direction are acquired (step S518). This will be described specifically. Borderlines each connecting the border coordinates including the same code value are acquired by the borderline intersection acquirer 44 based on the border coordinates, at a sub pixel precision, of the code values in each spatial code image. Where a borderline between a "code value n" and a "code value n+1" adjacent to the "code value n" is "border n", borderlines of n=0 to 254 (maximum value) are obtained in the spatial code image having the code value varying in the horizontal direction. These borderlines are parallel or substantially parallel to each other in the horizontal direction. In the spatial code image having the code value varying in the vertical direction, borderlines of n=0 to 254 (maximum value) are acquired. These borderlines are parallel or substantially parallel to each other in the vertical direction. In the case of the above-described projector (using 1366×768 as the size of an input image), borderlines of n=0 to 226 are acquired in the spatial code image having the code value varying in the horizontal direction, and borderlines of n=0 to 254 are acquired in the spatial code image having the code value varying in the vertical direction. In the process of step S518, as shown in FIG. 11, the borderline intersection acquirer 44 synthesizes the spatial code image having the code value varying in the horizontal direction and the spatial code image having the code value varying in the vertical direction. The borderline intersection acquirer 44 acquires intersection coordinates of the borderlines parallel or substantially parallel to each other in the horizontal direction and the borderlines parallel or substantially parallel to each other in the vertical direction. In FIG. 11, the borderlines parallel or substantially parallel to each other in the horizontal direction are represented by Un (n=0 to 226), and the borderlines parallel or substantially parallel to each other in the vertical direction are represented by Vn (n=0 to 254).

Figure 12:
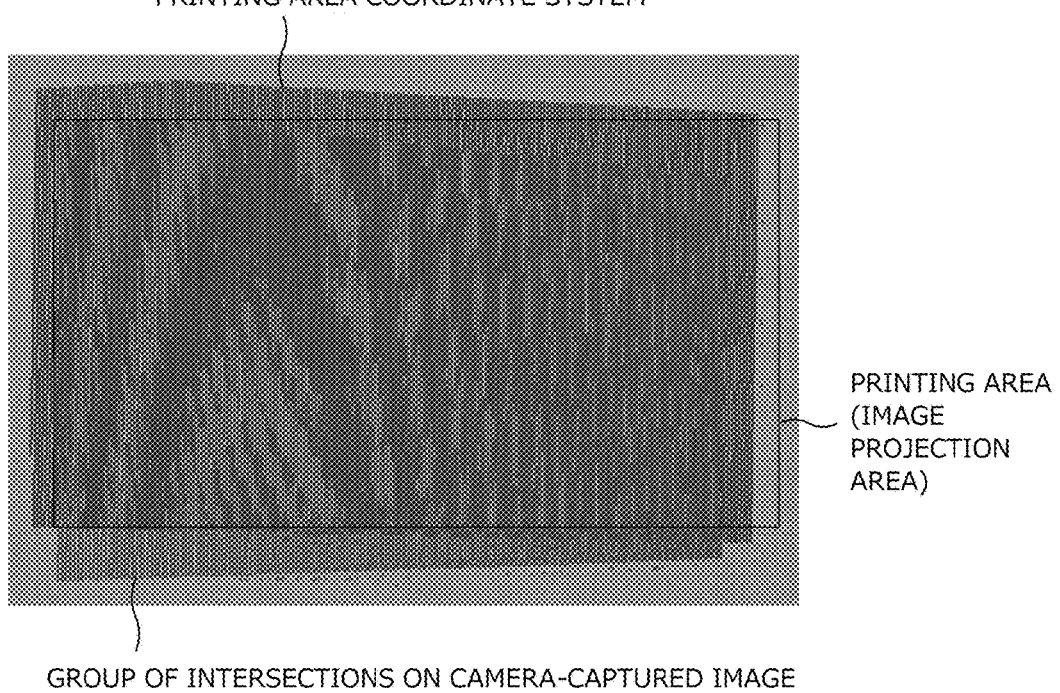
FIG. 12 shows a group of intersections in the camera-captured image coordinate system, a group of intersections in a printing area coordinate system transformed from those in the camera image-capturing coordinate system, and a printing area.
Figure 13A:
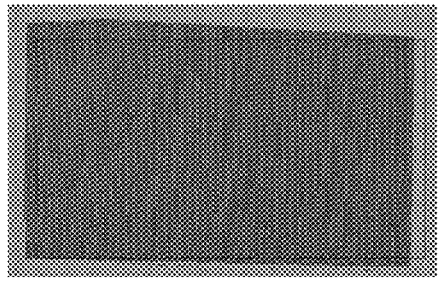
FIG. 13A shows a group of intersections after being transformed by use of a projection transform matrix H1.
Figure 13B:
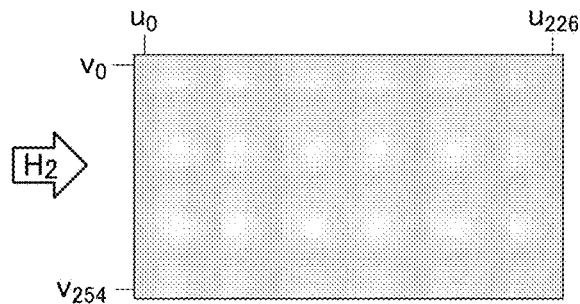
FIG. 13B shows a group of intersections located at ideal positions in the printing area.
Figure 13C:
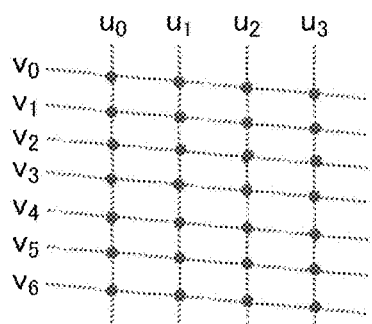
FIG. 13C is an enlarged view of a top left portion of the group of intersections after being transformed by use of the projection transform matrix H1 shown in FIG. 13A.
Figure 13D:
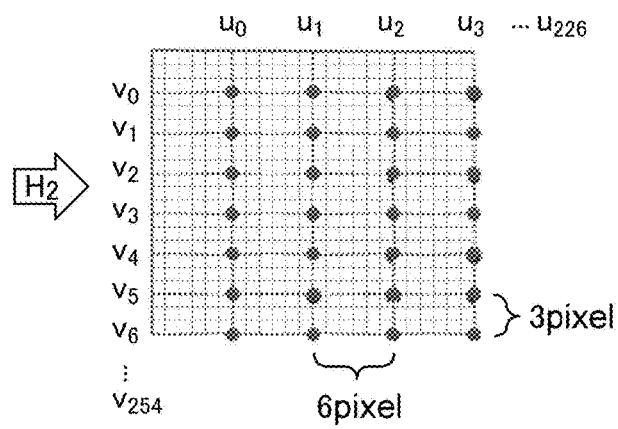
FIG. 13D is an enlarged view of a top left portion of the group of intersections located at the ideal positions in the printing area shown in FIG. 13B.

Then, the projection transform matrix H2 usable to perform a transformation such that the intersection coordinate values of the borderlines are uniformly or substantially uniformly distributed in the first area of the image projection area is calculated (step S520). This will be described specifically. First, as shown in FIG. 12, the intersection coordinate values of the borderlines are transformed by use of the projection transform matrix H1. Next, the projection transform matrix H2 usable to perform a projection transform such that a group of the intersections transformed into the coordinate values in the coordinate system of the printing area are uniformly or substantially uniformly distributed in the printing area is calculated by the above-described method (see FIG. 13A, FIG. 13B, FIG. 13C and FIG. 13D). In detail, the second transform matrix calculator 46 calculates the projection transform matrix H2 usable to transform the intersection coordinate values of the borderlines into intersection coordinates of the borderlines in a regular image having borderlines in a lattice in the first area.

The intersection coordinates of the borderlines in the regular image are calculated as follows. Where the size of an image input to the projector is "X"×"Y" pixels, first, an interval (i.e., number of pixels) at which the borderlines parallel or substantially parallel to each other in the vertical direction (i.e., Vn) acquired by the process of step S518 are uniformly or substantially uniformly distributed over Y (i.e., size of the shorter side of the image input to the projector) is calculated. In this step, the value of "j" with which $\{Y+(j-1)\}/j$ is closest to the number of the borderlines parallel or substantially parallel to each other in the vertical direction, the borderlines being acquired by the process of step S518, is set as the interval (i.e., number of pixels) between adjacent borderlines among the above-described borderlines. "j" is a positive integer. In the case of, for example, the above-described projector (using 1366×768 as the size of an input image), "Y" is "768". The number of borderlines parallel or substantially parallel to each other in the vertical direction that are acquired by the process of step S518 is "256" (n of the borderlines Vn is n=0 to 254). Therefore, the value of "j" with which $\{768+(j-1)\}/j$ is closest to "256" is determined. In this case, "j" is "3". Thus, the borderlines Vn parallel or substantially parallel to each other in the vertical direction are located at an interval of 3 pixels in the regular image.

Next, an interval at which the borderlines parallel or substantially parallel to each other in the horizontal direction (i.e., Un) acquired by the process of step S518 are uniformly or substantially uniformly distributed over X (i.e., size of the longer side of the image input to the projector) is acquired. In this step, the value of "k" with which $\{X+(k-1)\}/k$ is closest to the number of the borderlines parallel or substantially parallel to each other in the horizontal direction, the borderlines being acquired by the process of step S518, is set as the interval between adjacent borderlines among the above-described borderlines. "k" is a positive integer. In the case of, for example, the above-described projector (using 1366×768 as the size of an input image), "X" is "1366". The number of borderlines parallel or substantially parallel to each other in the horizontal direction is "228" (n of the borderlines Un is n=0 to 226). Therefore, the value of "k" with which $\{1366+(k-1)\}/k$ is closest to "226" is determined. In this case, "k" is "6". Thus, the borderlines Un parallel or substantially parallel to each other in the horizontal direction are located at an interval of 6 pixels in the regular image. In this manner, the regular image in which the borderlines Vn parallel or substantially parallel to each other in the vertical direction and the borderlines Un parallel or substantially parallel to each other in the horizontal direction are located in a grid is acquired, and the intersection coordinates of the borderlines Vn and the borderlines Un are calculated. Such intersection coordinates of the borderlines in the regular image may be calculated beforehand, or may be acquired before calculating the projection transform matrix H2 by the process of step S520.

Figure 14A:
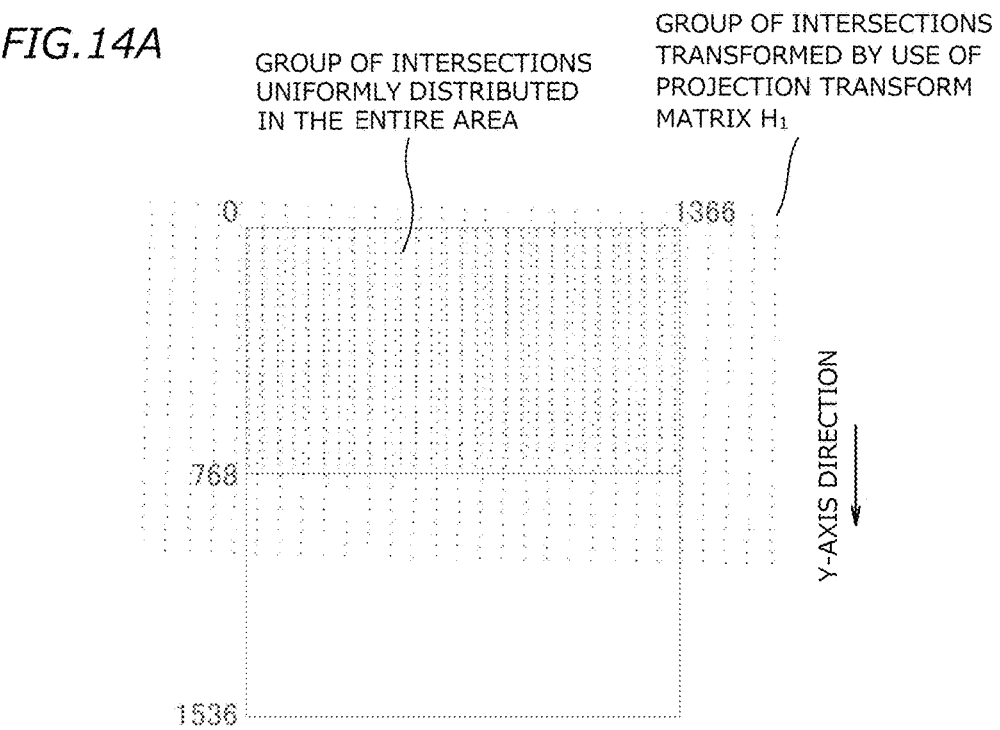
FIG. 14A shows a group of intersections, in an area to which a first projector is to project an image, after being transformed by use of the projection transform matrix H1, and a group of intersections uniformly or substantially uniformly distributed in the area.
Figure 14B:
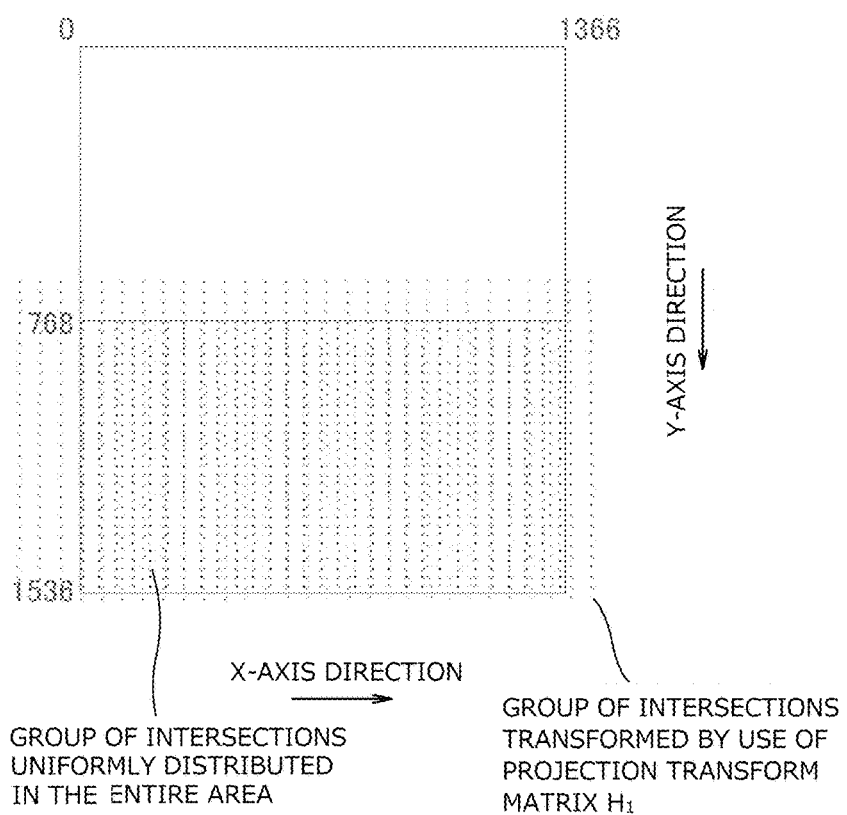
FIG. 14B shows a group of intersections, in an area to which a second projector is to project an image, after being transformed by use of the projection transform matrix H1, and a group of intersections uniformly or substantially uniformly distributed in the area.
Figure 15:
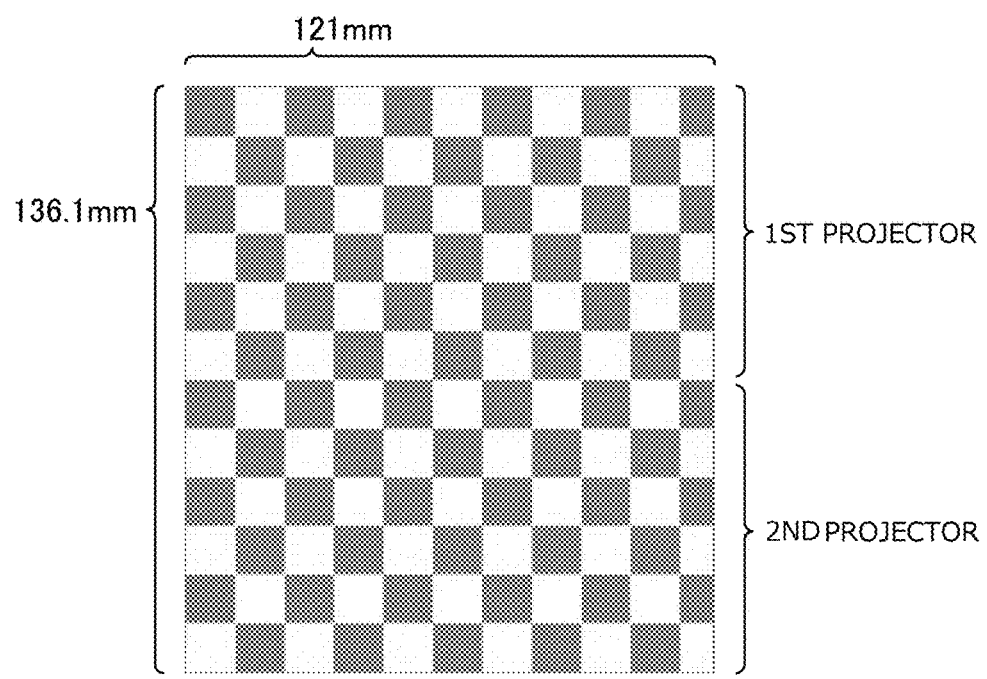
FIG. 15 shows an example of checker sheet usable for the image projection system according to a preferred embodiment of the present invention.
Figure 16:
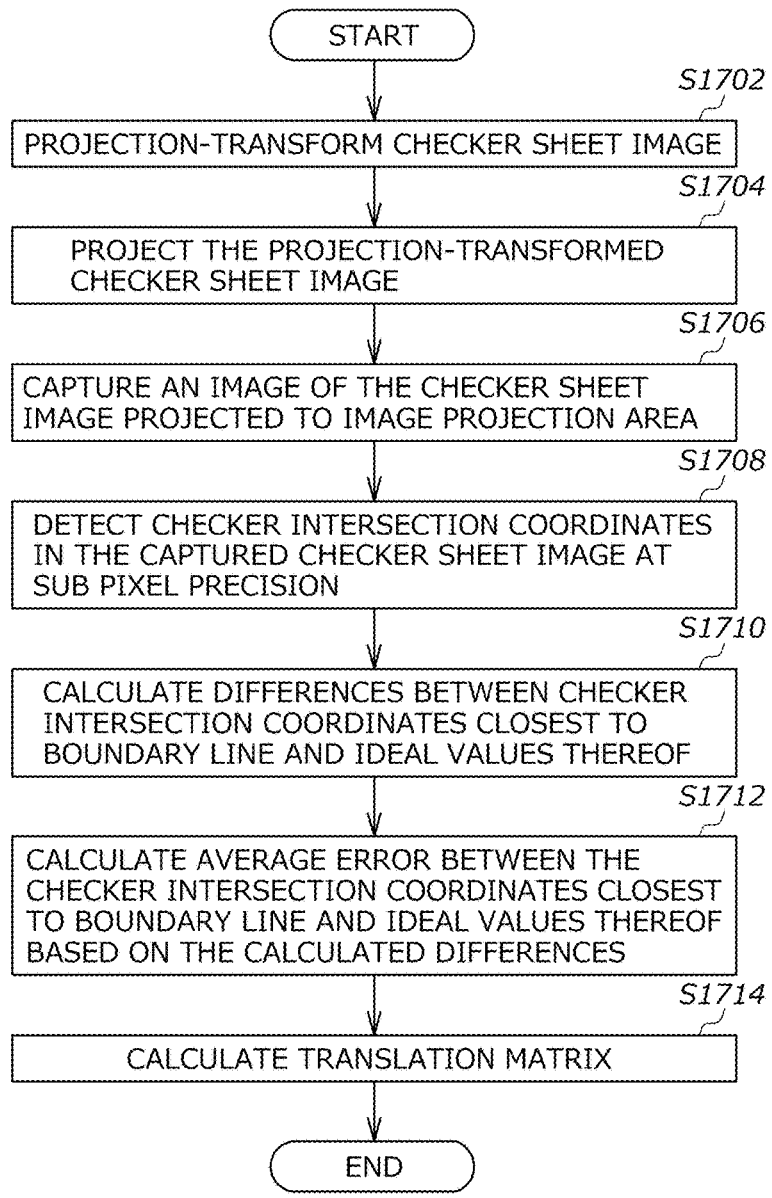
FIG. 16 is a flowchart showing a routine of a translation matrix calculation process to be performed by the image projection system according to a preferred embodiment of the present invention.

Then, the projection transform matrix H2 is calculated that is usable to transform the intersections, acquired by the process of step S581, of the borderlines Vn parallel or substantially parallel to each other in the vertical direction and the borderlines Un parallel or substantially parallel to each other in the horizontal direction into the intersections of the borderlines in the regular image. The borderlines Vn and the borderlines Un are of an image acquired by synthesizing the two spatial code images. The projection transform matrix H2 is calculated in substantially the same manner as the projection transform matrix H1. This will be described specifically. Used as the image coordinates (xs, ys) of a source are the intersection coordinates which have been transformed by use of the projection transform matrix H1 from the intersection coordinates of the borderlines Vn parallel or substantially parallel to each other in the vertical direction and the borderlines Un parallel or substantially parallel to each other in the horizontal direction in the image acquired by synthesizing the two spatial code images. Used as the image coordinates (xt, yt) of a target are the intersection coordinates of the borderlines in the regular image. The projection transform matrix H2 is calculated after the intersection coordinates which have been transformed by use of the projection transform matrix H1 (i.e., image coordinates (xs, ys) of the source) and the intersection coordinates of the borderlines in the regular image (i.e., image coordinates (xt, yt) of the target) are transformed into coordinates in a local coordinate system of the area to which the projector projects an image. In the case where, for example, the area for which the projection transform matrix H2 is to be calculated is represented by an X coordinate value in the range of n to m and a Y coordinate value in the range of p to q, the pre-transform coordinate (xu, yu) is as follows. The X coordinate value thereof is "xu"–"n", and the Y coordinate value thereof is "yu"–"p". Since the image projection area includes the first area and the second area, the image projection area specifically has an X coordinate value in the range of 0 to 1366 and a Y coordinate value in the range of 0 to 1536. Therefore, to calculate the projection transform matrix H2 for the projector 106a, as shown in FIG. 14A, the first area has an X coordinate value in the range of 0 to 1366 and a Y coordinate value in the range of 0 to 768. The pre-transform coordinate (xu, yu), after being transformed into the coordinates in the local coordinate system, is the same at (xu-0, yu-0). By contrast, to calculate the projection transform matrix H2 for the projector 106b, as shown in FIG. 14B, the second area has an X coordinate value in the range of 0 to 1366 and a Y coordinate value in the range of 768 to 1536. The pre-transform coordinate (xu, yu), after being transformed into the coordinates in the local coordinate system, is (xu-0, yu-768). In other words, in the local coordinate system, the X coordinate value is kept the same, whereas the Y coordinate value is decreased by 768. To calculate the projection transform matrix H2, all the intersection coordinates of the borderlines acquired by the transform by use of the projection transform matrix H1 are not used, but several intersection coordinates obtained as a result of thinning out the intersection coordinates at a certain interval are used. For example, the projection transform matrix H2 is calculated by use of every eighth intersection coordinates.

The projection transform matrix H2 calculated in this manner is output to the storage device 16 from the second transform matrix calculator 46. The storage device 16 stores the projection transform matrix H2 in association with the corresponding projector. Then, the operation returns to step S512.

When it is determined that the projection transform matrices H2 for all the projectors are stored in the storage device 16 (Yes in step S512), the transform matrix calculation process is finished. When the process is finished, the operator instructs start of calculation of the translation matrix by use of the pointing device 20 or the character input device 22. When the start of calculation of the translation matrix is instructed, the image projection system 10 starts the translation matrix calculation process.

The translation matrix calculator 52 performs a projection transform on the checker sheet image to be output to the projector 106a and also performs a projection transform on the checker sheet image to be output to the projector 106b, by use of the projection transform matrix H2 unique to each projector (step S1702). The checker sheet image to be output to each projector is a checker sheet image acquired by dividing one checker sheet image (large image) in accordance with the area to which each projector is to project an image (such a divided checker sheet image is referred to as a "divided image"). Each projector stores, beforehand, a checker sheet image unique thereto. Therefore, when the divided image is projected by each of the projectors, one checker sheet image is projected on the image projection area.

Next, the projector 106a projects a divided image of the checker sheet image to the first area, and the projector 106b projects a divided image of the checker sheet image to the second area (step S1704). Then, an image of the projected checker sheet image is captured by the camera 108 under the control of the translation matrix calculator 52 (step S1706). The captured checker sheet image has a distortion thereof caused by the lens corrected by the image corrector 34 by use of the inside parameter of the camera 108.

In the captured checker sheet image, there is a minute gap at the border between the divided image provided by the projector 106a and the divided image provided by projector 106b. This gap is caused due to the level of precision of the projection transform matrix H1, and is caused by environments of calibration, particularly, the material of the checker sheet used for calibration. The translation matrix calculation process described below in detail is performed in order to delete the gap, more specifically, in order to calculate a translation matrix T usable to translate the image output from each projector by a predetermined distance in a direction in which the gap is deleted.

Next, checker intersection coordinates in each divided image of the checker sheet image having the distortion corrected is detected at a sub pixel precision by the checker intersection coordinate detector 36 by use of the above-described sub pixel estimation method (step S1708).

Figure 18:
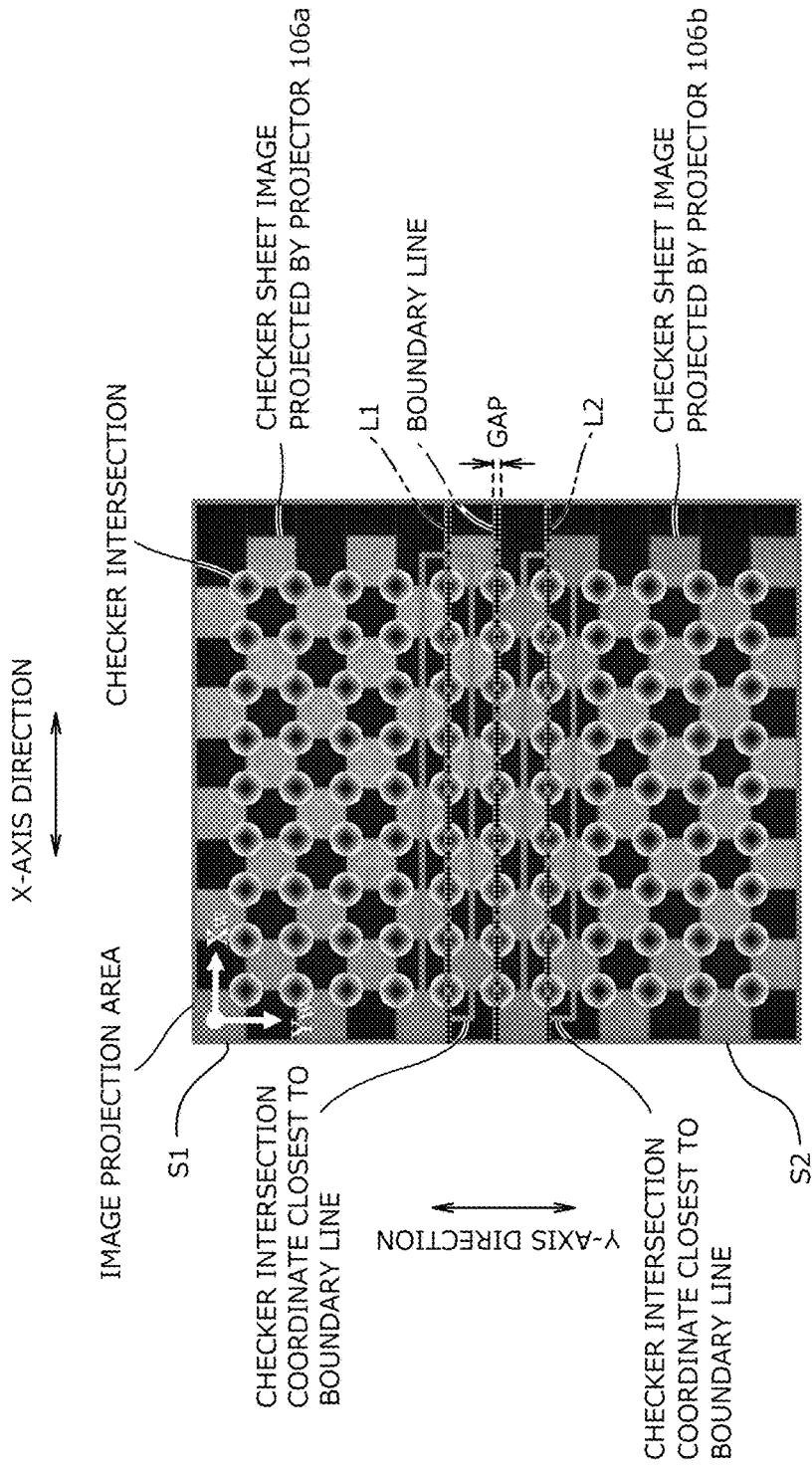
FIG. 18 shows the checker intersections in the checker sheet image projected to the image projection area by the two projectors.
Figure 21A:
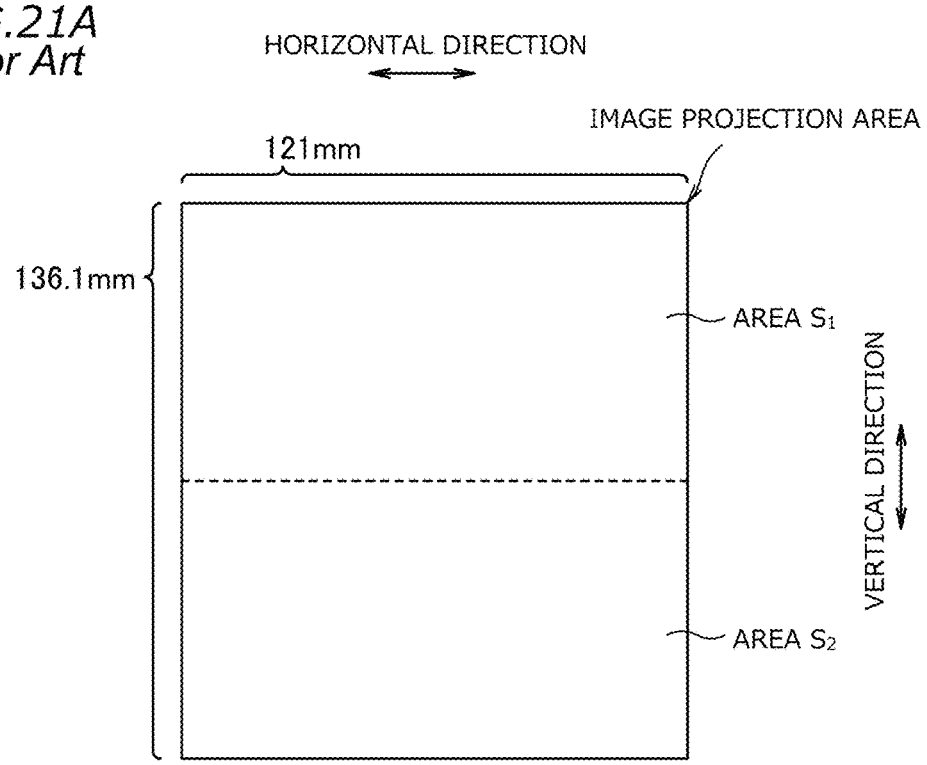
FIG. 21A shows an example of division of an image projection area.
Figure 21B:
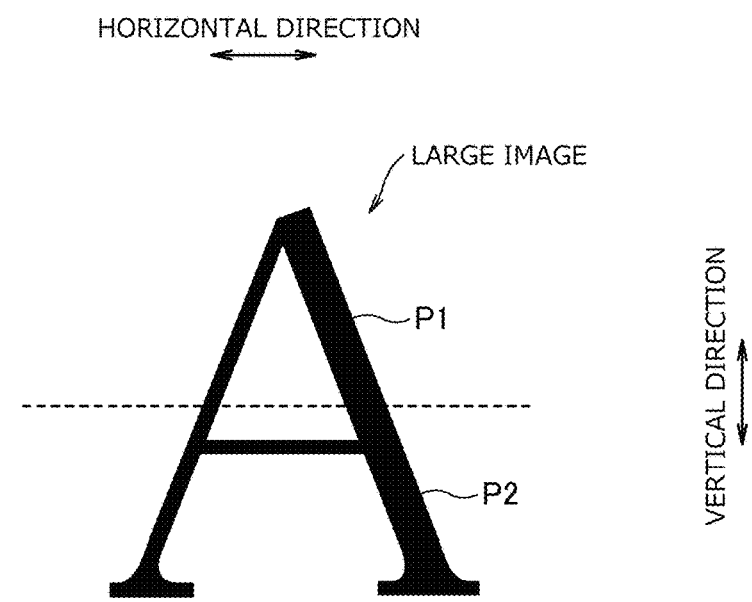
FIG. 21B shows an example of division of an image to be projected to the image projection area.

Then, differences between checker intersection coordinates closest to a boundary line among the detected checker intersection coordinates and ideal values (design values stored beforehand) for the checker intersection coordinates are calculated (step S1710). The "boundary line" is the borderline between the first area and the second area in the image projection area. In, for example, FIG. 21A, the "boundary line" is the borderline between the area S1 (i.e., first area) and the area S2 (i.e., second area), which is represented by the dashed line. The "checker intersection coordinates closest to the boundary line" are a group of checker intersection coordinates that are closest to the boundary line and arranged along a phantom line parallel or substantially parallel to the boundary line (X-axis direction or Y-axis direction). Specifically, in FIG. 18, the "checker intersection coordinates closest to the boundary line" are nine checker intersection coordinates that are closest to the boundary line and arranged along a phantom line L1 parallel or substantially parallel to the boundary line and nine checker intersection coordinates that are closest to the boundary line and arranged along a phantom line L2 parallel or substantially parallel to the boundary line. In the process of step S1710, the translation matrix calculator 52 calculates differences between the checker intersection coordinates closest to the boundary line in the divided image provided by the projector 106a and the ideal values thereof and differences between the checker intersection coordinates closest to the boundary line in the divided image provided by the projector 106b and the ideal values thereof. In this manner, errors between the checker intersection coordinates other than the checker intersection coordinates closest to the boundary line and the ideal values thereof are excluded beforehand, and thus an average error described later is acquired with higher reliability and the precision of the above-described deletion of the gap is improved.

Based on the calculated differences, an average error between the checker intersection coordinates closest to the boundary line and the ideal values thereof is calculated (step S1712). The calculated average error is set as a translation distance, and a translation matrix usable to translate the image projection-transformed by use of the projection transform matrix H2 by the translation distance is calculated (step S1714). A method for calculating the translation matrix will be described later.

The average error calculated by the process of step S1712 is an average error in a world coordinate system. The average error in the world coordinate system is used to acquire the following translation vector in the world coordinate system by the following expression (4).

$$(t_x^W, t_y^W) \qquad \text{Expression 8}$$

Expression 9

$$\begin{cases} t_{x_i}^W = \mu_{x_i} + 2*\sigma_{x_i} \\ t_{y_i}^W = \mu_{yi} + 2*\sigma_{y_i} \end{cases}, \quad 0 \leq i < 2 \qquad (4)$$

In the above expression, "i" is the index of the projector (in this preferred embodiment, up to "2" for the projector 106a and the projector 106b, for example). "μ" is the average error, and "σ" is the standard deviation. The translation vector thus calculated has a vector value in the world coordinate system. Thus, the above-described expression (4) is transformed into the following translation vector in the local coordinate system for each projector.

$$(t_x^L, t_y^L) \qquad \text{Expression 10}$$

Specifically, expression (4) is transformed into the local coordinate system for the projector 106a by the following expression (5).

Expression 11

$$\begin{bmatrix} t_{x0}^L \\ t_{y0}^L \\ 1 \end{bmatrix} = \begin{bmatrix} 1 & 0 & 0 \\ 0 & -1 & 0 \\ 0 & 0 & 1 \end{bmatrix} \begin{bmatrix} t_{x0}^W \\ t_{y0}^W \\ 1 \end{bmatrix} \qquad (5)$$

Expression (4) is transformed into the local coordinate system for the projector 106b by the following expression (6).

Expression 12

$$\begin{bmatrix} t_{x1}^L \\ t_{y1}^L \\ 1 \end{bmatrix} = \begin{bmatrix} -1 & 0 & 0 \\ 0 & 1 & 0 \\ 0 & 0 & 1 \end{bmatrix} \begin{bmatrix} t_{x1}^W \\ t_{y1}^W \\ 1 \end{bmatrix} \qquad (6)$$

The following translation vectors for the projectors 106a and 106b calculated in this manner are each substituted into (tx, ty) in the following matrix, and the resultant matrix is acquired as the translation matrix T unique to each projector.

$$(t_x^L, t_y^L) \qquad \text{Expression 13}$$

$$T = \begin{bmatrix} 1 & 0 & t_x \\ 0 & 1 & t_y \\ 0 & 0 & 1 \end{bmatrix} \qquad \text{Expression 14}$$

The acquired translation matrix T is output to the storage device 16 from the translation matrix calculator 52 and stored in the storage device 16 as the translation matrix T unique to each projector. The translation matrix T may be stored as being associated with the projection transform matrix H2 unique to each projector. In such a case, the translation matrix T is stored as being multiplied with the projection transform matrix H2.

Next, the operator instructs creation of divided images by operating the pointing device 20, the character input device 22 or the like. Then, image data on the divided images to be output to the projectors 106a and 106b is created by the divided image generator 54 by use of slice images input to the divided image generator 54 beforehand. This will be described specifically. As shown in FIG. 19A, a slice image representing one layer of the three-dimensional printing object is equally or substantially equally divided along an equally or substantially equally dividing line. The upper equally or substantially equally divided image and an image extended by one pixel downward from the equally or substantially equally dividing line are acquired as image data of the divided image to be output to the projector 106a. The lower equally or substantially equally divided image and an image extended by one pixel upward from the equally or substantially equally dividing line are acquired as image data of the divided image to be output to the projector 106b. In the case where, for example, the size of the slice image is 1366×1536 pixels, the size of the image data on the divided image to be output to each of the projector 106a and the projector 106b is 1366×769 pixels. The image data on the divided image to be output to the projector 106a and the image data on the divided image to be output to the projector 106b are stored in the storage device 16 as being associated to each other.

Figure 20:
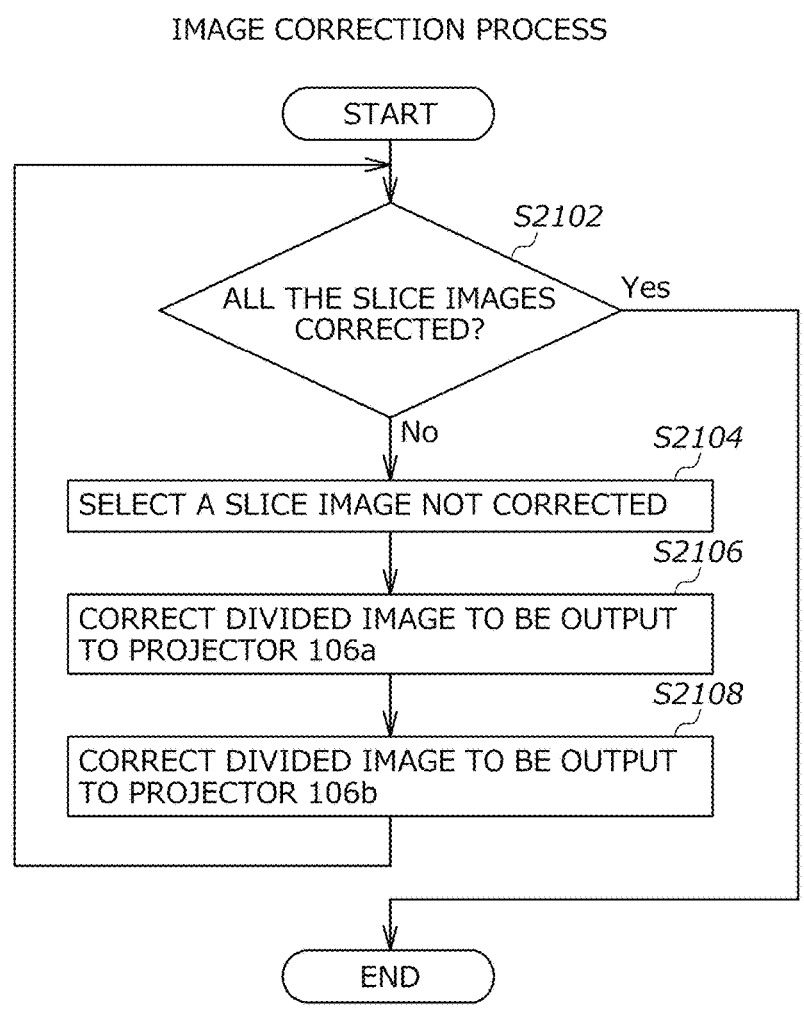
FIG. 20 is a flowchart showing a routine of an image correction process to be performed by the image projection system according to a preferred embodiment of the present invention.

Then, the operator instructs start of an image correction process by use of the pointing device 20, the character input device 22 or the like. As shown in FIG. 20, when the start of the image correction process is instructed, first, it is determined whether or not the correction process has been performed on all the slice images (step S2102). In detail, the image data corrector 48 determines whether or not there is a slice image on which the correction process for divided images has not been performed.

When it is determined that there is at least one slice image on which the correction process for divided images has not been performed (No in step S2102), the image data corrector 48 selects one of the at least one slice image on which the correction process for divided images has not been performed (step S2140). The slice image may be selected as follows, for example. The slice images respectively have serial numbers assigned thereto, and a slice image having a smallest number is selected.

Next, the image data corrector 48 corrects the selected slice image as follows. As shown in FIG. 19B, a divided image, in the selected slice image, that is to be output to the projector 106a is rotated by 180 degrees, and then the origin of the rotated image (i.e., the origin of the local coordinate system for the projector 106a) is shifted by one pixel in a direction opposite to the direction in which the upper image was extended from the equally or substantially equally dividing line, more specifically, is shifted upward. In addition, the image data on the divided image is corrected by the following expression (7) by use of the translation matrix T and the projection transform matrix H2 (step S2106). As a result of transforming the image data of the divided image for the projector 106a by use of the translation matrix T, the entirety of the divided image is moved in a direction in which the above-described gap is deleted. The image data on the divided image for the projector 106b is corrected by use of the translation matrix T and the projection transform matrix H2 in substantially the same manner.

Expression 15

$$s \begin{bmatrix} x'_s \\ y'_s \\ 1 \end{bmatrix} = T \cdot H \cdot G \cdot \begin{bmatrix} x_s \\ y_s \\ 1 \end{bmatrix}, \quad (7)$$

$$T = \begin{bmatrix} 1 & 0 & t_x \\ 0 & 1 & t_y \\ 0 & 0 & 1 \end{bmatrix},$$

$$H = \begin{bmatrix} h_{11} & h_{12} & h_{13} \\ h_{21} & h_{22} & h_{23} \\ h_{31} & h_{32} & h_{33} \end{bmatrix},$$

$$G = \begin{bmatrix} 1 & 0 & 0 \\ 0 & 1 & -1 \\ 0 & 0 & 1 \end{bmatrix}$$

In the above expression (7), "G" is the translation matrix usable to translate the origin by one pixel. The translation matrix T is calculated by the translation matrix calculation process and is unique to the projector 106a. The projection transform matrix H2 is calculated by the projection transform matrix calculation process and is unique to the projector 106a. (xs, ys) is a coordinate in the slice image, and (x's, y's) is a coordinate in the post-transform slice image.

The projection transform by use of the projection transform matrix H2 is specifically performed by finding a pre-transform coordinate (real number) from a post-transform integer coordinate and finding the pixel value at the coordinate by bilinear interpolation. The process of projection transform on the image data by use of the projection transform matrix H2 may be performed by use of, for example, warpPerspective ( ) function in the case of Open CV 2.x. The size of the post-projection transform image data is adapted to the size of the first area S1 to which the projector 106a is to project an image. More specifically, the divided image having a size of 1366×769 pixels, after being projection-transformed, has a size of 1366×768. The image data corrected in this manner is stored in the storage device 16.

Next, the image data corrector 48 corrects the divided image to be output to the projector 106b as follows. As shown in FIG. 19C, the origin of the divided image to be output to the projector 106b (i.e., the origin of the local coordinate system for the projector 106b) is shifted by one pixel in a direction opposite to the direction in which the lower image was extended from the equally or substantially equally dividing line, more specifically, is shifted downward. The divided image is not rotated. In addition, the image data on the divided image is corrected by the above expression (7) by use of the translation matrix T and the projection transform matrix H2 (step S2108). For the correction, the translation matrix T and the projection transform matrix H2 unique to the projector 106b are used. The size of the post-transform image data is adapted to the size of the second area S2 to which the projector 106b is to project an image. More specifically, the divided image having a size of 1366×769 pixels, after being projection-transformed, has a size of 1366×768. The image data corrected in this manner is stored in the storage device 16.

When the corrected image data is stored, the operation returns to step S2012, and the processes in step S2102 and the steps thereafter are executed. When it is determined that there is no slice image on which the correction process for divided images has not been performed (Yes in step S2102), the image correction process is finished.

As described above, an image including an equally or substantially equally divided image and an additional image extending by a distance of a predetermined number of pixels is used as the divided image, and the correction by the image data corrector 48 is performed by shifting the origin of the divided image by the predetermined pixel. As a result, the gap between the divided images is deleted. In this case, the distance of the predetermined number of pixels is set to be longer than or equal to the length of the gap (size of the gap in the vertical direction). Even in the case where the distance of the predetermined number of pixels is shorter than the length of the gap, the gap between the divided images is deleted by further transforming the image data by use of the translation matrix T.

Next, the operator instructs production of the three-dimensional printing object by use of the optical printing device 100. Then, the image data on the post-correction divided images stored in the storage device 16 is output to the projector 106a and the projector 106b. The projectors 106a and 106b each project the corrected image, and thus one slice image is properly projected to the image projection area.

As described above, with the image projection system 10 in this preferred embodiment, the projection transform matrix H2 usable to correct the image to be projected is calculated for each projector, and the image to be projected by each projector is corrected by use of the calculated projection transform matrix H2. As a result, the image corrected in accordance with the position or the posture of the projector is properly projected. As can be seen, the image projection system 10 allows an image to be projected to an image projection area properly with no need of adjusting the position or the posture of each projector. Therefore, there is no need to provide a mechanism that adjusts the position or the posture of the projector as is needed in the conventional art. This prevents the entire device from being enlarged, decreases the number of required parts and components, and significantly reduces the production cost.

A gap may be caused between divided images by due the level of precision of the projection transform matrix H1 or the material of the checker sheet. In this preferred embodiment, the translation matrix T is calculated, and the calculated translation matrix T is used to correct the image to be projected by each projector. This deletes the gap between the divided images. The gap may also be deleted by shifting the origin of the first divided image and the origin of the second divided image toward the borderline between the first divided image and the second divided image by a distance of a predetermined number of pixels.

The above-described preferred embodiments may be modified as described in modifications (1) through (11) below.

(1) In the above-described preferred embodiments, the image projection system 10 preferably is mounted on the optical printing device 100. Alternatively, the image projection system 10 may be used for any of various devices that require a mechanism projecting an image, other than the optical printing device 100.

(2) Although not specifically described in the above-described preferred embodiments, the camera 108 may be detachable from the image projection device 10. More specifically, the camera 108 may be attached to a predetermined position of the optical printing device 100 at a predetermined timing, for example, at the time of shipment of the optical printing device 100 from the plant or at the time of adjustment performed on the projectors 106a and 106b, for the purpose of calculating the projection transform matrix H2 or the translation matrix T.

(3) In the above-described preferred embodiments, the translation matrix calculation process preferably is performed based on an instruction of the operator after the transform matrix calculation process is finished. The present invention is not limited to this. The translation matrix calculation process may be performed with no instruction from the operator after the transform matrix calculation process is finished.

(4) In the above-described preferred embodiments, the image correction process preferably is performed based on an instruction of the operator after the divided images are created. The present invention is not limited to this. The image correction process may be performed with no instruction from the operator after the divided images are created.

(5) In the above-described preferred embodiments, for creating divided images, a slice image preferably is equally or substantially equally divided and each equally or substantially equally divided image extended by one pixel and the resultant image preferably is set as the divided image. The present invention is not limited to this. The number of pixels by which the equally or substantially equally divided image extended may be a predetermined number of 2 or greater.

(6) In the above-described preferred embodiments, to correct a divided image, a divided image is transformed by use of the projection transform matrix and also translated by a predetermined distance by use of the calculated translation matrix T. In addition, to create a divided image, a slice image is equally or substantially equally divided, each equally or substantially equally divided image extended by one pixel from the equally or substantially equally dividing line, and the resultant image is set as the divided image. Only either one of these processes may be performed. More specifically, a slice image may be equally or substantially equally divided, and the equally or substantially equally divided image may be acquired as the divided image as in the conventional art. The acquired divided image may be transformed by use of the projection transform matrix and translated by a predetermined distance by use of the translation matrix T to be corrected. In this case, the translation matrix G is deleted from the above expression (7), and the divided image is corrected by the above expression (7) deprived of the translation matrix G. Alternatively, the divided image may be created as follows. A slice image is equally or substantially equally divided, the equally or substantially equally divided image extended by one pixel from the equally or substantially equally dividing line, the resultant image is acquired as the divided image, and the divided image is transformed by use of the projection transform matrix to be corrected. In this case, the translation matrix T is deleted from the above expression (7), and the divided image is corrected by the above expression (7) deprived of the translation matrix T.

(7) In the above-described preferred embodiments, an average of errors between the checker intersection coordinates closest to the boundary line and the ideal values thereof preferably is calculated. The present invention is not limited to this. An average of errors between all the checker intersection coordinates and the ideal values thereof may be calculated.

(8) In the above-described preferred embodiments, the projector 106a and the projector 106b preferably have the same specifications. The present invention is not limited to this. The projector 106a and the projector 106b may have different specifications from each other (resolution, projection range, etc.).

(9) In the above-described preferred embodiments, the projector 106a preferably is rotated by 180 degrees with respect to the projector 106b to face the projector 106b. The present invention is not limited to this. The projector 106a may be located to face the projector 106b without being rotated. In this case, the transform matrix usable for a transform into the local coordinate system for the projector 106b described above with reference to the above expression (6) is used as the transform matrix usable for a transform into the local coordinate system for the projector 106a described above with reference to the above expression (5).

(10) In the above-described preferred embodiments, the first divided image and the second divided image preferably are translated to shift. The present invention is not limited to this. One of the first divided image and the second divided image may be translated to delete the gap between the divided images.

(11) The above-described preferred embodiments and the modifications described in (1) through (10) may be appropriately combined.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An image projection system for projecting a first divided image to a first area of an image projection area using a first image projection device and projecting a second divided image to a second area, adjacent to the first area, of the image projection area using a second image projection device to project a large image including the first divided image and the second divided image to the image projection area, the image projection system comprising:
   an image capturing device that captures, with a lens, an image of a first checker sheet including a checkered pattern including horizontal lines and vertical lines, the first checker sheet being placed on the image projection area;
   a corrector that corrects a distortion, caused by the lens, of a first checker sheet image as an image of the first checker sheet captured by the image capturing device, the distortion being corrected by use of an inside parameter of the image capturing device;
   a checker intersection coordinate detector that detects checker intersection coordinates as intersection coordinates of the horizontal lines and the vertical lines in the post-correction first checker sheet image;
   a first transform matrix calculator that calculates a first transform matrix usable to projection-transform the detected checker intersection coordinates into checker intersection coordinates uniformly or substantially uniformly distributed in the image projection area;
   a spatial code image generator that creates a first spatial code image as a gray scale image from a first positive image and a first negative image projected to the first area by the first image projection device, the first positive image and the first negative image including a gray code pattern that has a luminance value varying in a horizontal direction, creates a second spatial code image as a gray scale image from a second positive image and a second negative image projected to the first area by the first image projection device, the second positive image and the second negative image including a gray code pattern that has a luminance value varying in a vertical direction, creates a third spatial code image as a gray scale image from a third positive image and a third negative image projected to the second area by the second image projection device, the third positive image and the third negative image including a gray code pattern that has a luminance value varying in the horizontal direction, and creates a fourth spatial code image as a gray scale image from a fourth positive image and a fourth negative image projected to the second area by the second image projection device, the fourth positive image and the fourth negative image including a gray code pattern that has a luminance value varying in the vertical direction;
   a border coordinate acquirer that acquires a plurality of first border coordinates in the first spatial code image from a luminance distribution curve of the first positive image and the first negative image, acquires a plurality of second border coordinates in the second spatial code image from a luminance distribution curve of the second positive image and the second negative image, acquires a plurality of third border coordinates in the third spatial code image from a luminance distribution curve of the third positive image and the third negative image, and acquires a plurality of fourth border coordinates in the fourth spatial code image from a luminance distribution curve of the fourth positive image and the fourth negative image;
   an intersection coordinate acquirer that acquires first borderlines each connecting first border coordinates including the same code among the plurality of first border coordinates in the first spatial code image, second borderlines each connecting second border coordinates including the same code among the plurality of second border coordinates in the second spatial code image, third borderlines each connecting third border coordinates including the same code among the plurality of third border coordinates in the third spatial code image, and fourth borderlines each connecting fourth border coordinates including the same code among the plurality of fourth border coordinates in the fourth spatial code image; and synthesizes the first spatial code image and the second spatial code image and synthesizes the third spatial code image and the fourth spatial code image to acquire first intersection coordinates of the first borderlines and the second borderlines and second intersection coordinates of the third borderlines and the fourth borderlines;
   a second transform matrix calculator that transforms the first intersection coordinates and the second intersection coordinates by use of the first projection transform matrix, transforms the first intersection coordinates transformed by use of the first projection transform matrix into coordinates in a local coordinate system for the first image projection device, then calculates a second projection transform matrix usable to projection-transform the first intersection coordinates into intersection coordinates uniformly or substantially uniformly distributed in the first area, transforms the second intersection coordinates transformed by use of the first projection transform matrix into coordinates in a local coordinate system for the second image projection device, and then calculates a third projection transform matrix usable to projection-transform the second intersection coordinates into intersection coordinates uniformly or substantially uniformly distributed in the second area;
   a divided image generator that creates a first divided image to be output to the first image projection device and a second divided image to be output to the second image projection device; and
   an image corrector that transforms image data on the first divided image by use of the second projection transform matrix, transforms image data on the second divided image by use of the third projection transform matrix, and translates at least one of the first divided image and the second divided image toward a borderline between the first divided image and the second divided image to delete a gap between the first divided image and the second divided image.

2. An image projection system according to claim 1, further comprising:
   a storage device that stores, beforehand, a second checker sheet image including a third divided image to be projected to the first area and a fourth divided image to be projected to the second area, the second checker sheet image including a checkered pattern including horizontal lines and vertical lines, the storage device also storing, beforehand, first design values for checker intersection coordinates in the third divided image, and second design values for checker intersection coordinates in the fourth divided image; and a translation matrix calculator that performs a projection transform on the third divided image by use of the second projection transform matrix, and performs a projection transform on the fourth divided image by use of the third projection transform matrix; wherein after the projection-transformed third divided image is projected to the first area by the first projection device and the projection-transformed fourth divided image is projected to the second area by the second projection device to project the second checker sheet image to the image projection area, the projected second checker sheet image is captured by the image capturing device, and the checker intersection coordinates in the third divided image in the captured second checker sheet image and the checker intersection coordinates in the fourth divided image in the captured second checker sheet image are detected by the checker intersection coordinate detector;

the translation matrix calculator calculates a first difference between the detected checker intersection coordinates in the third divided image and the first design values and a second difference between the detected checker intersection coordinates in the fourth divided image and the second design values, and calculates a first translation matrix usable to translate the third divided image a distance corresponding to the first difference and a second translation matrix usable to translate the fourth divided image a distance corresponding to the second difference; and the image data corrector is configured to transform the image data on the first divided image by use of the first translation matrix and the second projection transform matrix, and to transform the image data on the second divided image by use of the second transform matrix and the third projection transform matrix.

3. An image projection system according to claim 2, wherein the divided image generator equally or substantially equally divides the large image to be projected to the image projection area into a first equally or substantially equally divided image and a second equally or substantially equally divided image along an equally or substantially equally dividing line, creates, as the first divided image to be output to the first projection device, a combination of the first equally or substantially equally divided image and a portion of the second equally or substantially equally divided image extending by a distance of a predetermined number of pixels from the equally or substantially equally dividing line, and creates, as the second divided image to be output to the second projection device, a combination of the second equally or substantially equally divided image and a portion of the first equally or substantially equally divided image extending by the distance of the predetermined number of pixels from the equally or substantially equally dividing line; and the image corrector shifts an origin of the created first divided image toward the equally or substantially equally dividing line by the distance of the predetermined number of pixels to perform a correction before the transform is performed by use of the second projection transform matrix and the first translation matrix, and shifts an origin of the created second divided image toward the equally or substantially equally dividing line by the distance the predetermined number of pixels to perform a correction before the transform is performed by use of the third projection transform matrix and the second translation matrix.

4. An image projection system according to claim 2, wherein the checker intersection coordinates in the third divided image and the checker intersection coordinates in the fourth divided image include a plurality of checker intersection coordinates that are closest to a borderline between the third divided image and the fourth divided image and are arranged in a direction parallel or substantially parallel to the borderline between the third divided image and the fourth divided image.

5. An image projection system for projecting a first divided image to a first area of an image projection area using a first image projection device and projecting a second divided image to a second area, adjacent to the first area, of the image projection area using a second image projection device to project a large image including the first divided image and the second divided image to the image projection area, the image projection system comprising:

an image capturing device that captures, with a lens, an image of a first checker sheet including a checkered pattern including horizontal lines and vertical lines, the first checker sheet being placed on the image projection area;

a corrector that corrects a distortion, caused by the lens, of a first checker sheet image as an image of the first checker sheet captured by the image capturing device, the distortion being corrected by use of an inside parameter of the image capturing device;

a checker intersection coordinate detector that detects checker intersection coordinates as intersection coordinates of the horizontal lines and the vertical lines in the post-correction first checker sheet image;

a first transform matrix calculator that calculates a first transform matrix usable to projection-transform the detected checker intersection coordinates into checker intersection coordinates uniformly or substantially uniformly distributed in the image projection area;

a spatial code image generator that creates a first spatial code image as a gray scale image from a first positive image and a first negative image projected to the first area by the first image projection device, the first positive image and the first negative image including a gray code pattern that has a luminance value varying in a horizontal direction, creates a second spatial code image as a gray scale image from a second positive image and a second negative image projected to the first area by the first image projection device, the second positive image and the second negative image including a gray code pattern that has a luminance value varying in a vertical direction, creates a third spatial code image as a gray scale image from a third positive image and a third negative image projected to the second area by the second image projection device, the third positive image and the third negative image including a gray code pattern that has a luminance value varying in the horizontal direction, and creates a fourth spatial code image as a gray scale image from a fourth positive image and a fourth negative image projected to the second area by the second image projection device, the fourth positive image and the fourth negative image including a gray code pattern that has a luminance value varying in the vertical direction;

a border coordinate acquirer that acquires a plurality of first border coordinates in the first spatial code image from a luminance distribution curve of the first positive image and the first negative image, acquires a plurality of second border coordinates in the second spatial code image from a luminance distribution curve of the second positive image and the second negative image, acquires a plurality of third border coordinates in the third spatial code image from a luminance distribution curve of the third positive image and the third negative image, and acquires a plurality of fourth border coordinates in the fourth spatial code image from a luminance distribution curve of the fourth positive image and the fourth negative image;

an intersection coordinate acquirer that acquires first borderlines each connecting first border coordinates including the same code among the plurality of first border coordinates in the first spatial code image, second borderlines each connecting second border coordinates including the same code among the plurality of second border coordinates in the second spatial code image, third borderlines each connecting third border coordinates including the same code among the plurality of third border coordinates in the third spatial code image, and fourth borderlines each connecting fourth border coordinates including the same code among the plurality of fourth border coordinates in the fourth spatial code image; and synthesizes the first spatial code image and the second spatial code image and synthesizes the third spatial code image and the fourth spatial code image to acquire first intersection coordinates of the first borderlines and the second borderlines and second intersection coordinates of the third borderlines and the fourth borderlines;

a second transform matrix calculator that transforms the first intersection coordinates and the second intersection coordinates by use of the first projection transform matrix, transforms the first intersection coordinates transformed by use of the first projection transform matrix into coordinates in a local coordinate system for the first image projection device, then calculates a second projection transform matrix usable to projection-transform the first intersection coordinates into intersection coordinates uniformly or substantially uniformly distributed in the first area, transforms the second intersection coordinates transformed by use of the first projection transform matrix into coordinates in a local coordinate system for the second image projection device, and then calculates a third projection transform matrix usable to projection-transform the second intersection coordinates into intersection coordinates uniformly or substantially uniformly distributed in the second area;

a divided image generator that equally or substantially equally divides the large image to be projected to the image projection area into a first equally or substantially equally divided image and a second equally or substantially equally divided image along an equally or substantially equally dividing line, creates, as the first divided image to be output to the first projection device, a combination of the first equally or substantially equally divided image and a portion of the second equally or substantially equally divided image extending by a distance of a predetermined number of pixels from the equally or substantially equally dividing line, and creates, as the second divided image to be output to the second projection device, a combination of the second equally or substantially equally divided image and a portion of the first equally or substantially equally divided image extending by the distance of the predetermined number of pixels from the equally or substantially equally dividing line; and an image corrector that shifts an origin of the created first divided image and an origin of the created second divided image toward the equally or substantially equally dividing line by the distance of the predetermined number of pixels to perform a correction of deleting a gap between the first divided image and the second divided image, transforms image data on the first divided image by use of the second projection transform matrix, and transforms image data on the second divided image by use of the third projection transform matrix.

6. An image projection system according to claim 5, wherein the distance of the predetermined number of pixels is longer than or equal to a length of the gap.

7. An image projection method for projecting a first divided image to a first area of an image projection area using a first image projection device and projecting a second divided image to a second area, adjacent to the first area, of the image projection area using a second image projection device to project a large image including the first divided image and the second divided image to the image projection area, the image projection method comprising:

capturing, with a lens of an image capturing device, an image of a first checker sheet including a checkered pattern including horizontal lines and vertical lines, the first checker sheet being placed on the image projection area;

correcting a distortion, caused by the lens, of a first checker sheet image as an image of the first checker sheet captured by the image capturing device, the distortion being corrected by use of an inside parameter of the image capturing device;

detecting checker intersection coordinates as intersection coordinates of the horizontal lines and the vertical lines in the post-correction first checker sheet image;

calculating a first transform matrix usable to projection-transform the detected checker intersection coordinates into checker intersection coordinates uniformly or substantially uniformly distributed in the image projection area;

creating a first spatial code image as a gray scale image from a first positive image and a first negative image projected to the first area by the first image projection device, the first positive image and the first negative image including a gray code pattern that has a luminance value varying in a horizontal direction, creating a second spatial code image as a gray scale image from a second positive image and a second negative image projected to the first area by the first image projection device, the second positive image and the second negative image including a gray code pattern that has a luminance value varying in a vertical direction, creating a third spatial code image as a gray scale image from a third positive image and a third negative image projected to the second area by the second image projection device, the third positive image and the third negative image including a gray code pattern that has a luminance value varying in the horizontal direction, and creating a fourth spatial code image as a gray scale image from a fourth positive image and a fourth negative image projected to the second area by the second image projection device, the fourth positive image and the fourth negative image including a gray code pattern that has a luminance value varying in the vertical direction;

acquiring a plurality of first border coordinates in the first spatial code image from a luminance distribution curve of the first positive image and the first negative image, acquiring a plurality of second border coordinates in the second spatial code image from a luminance distribution curve of the second positive image and the second negative image, acquiring a plurality of third border coordinates in the third spatial code image from a luminance distribution curve of the third positive image and the third negative image, and acquiring a plurality of fourth border coordinates in the fourth spatial code image from a luminance distribution curve of the fourth positive image and the fourth negative image;

acquiring first borderlines each connecting first border coordinates including the same code among the plurality of first border coordinates in the first spatial code image, second borderlines each connecting second border coordinates including the same code among the plurality of second border coordinates in the second spatial code image, third borderlines each connecting third border coordinates including the same code among the plurality of third border coordinates in the third spatial code image, and fourth borderlines each connecting fourth border coordinates including the same code among the plurality of fourth border coordinates in the fourth spatial code image; and synthesizing the first spatial code image and the second spatial code image and synthesizing the third spatial code image and the fourth spatial code image to acquire first intersection coordinates of the first borderlines and the second borderlines and second intersection coordinates of the third borderlines and the fourth borderlines;

transforming the first intersection coordinates and the second intersection coordinates by use of the first projection transform matrix, transforming the first intersection coordinates transformed by use of the first projection transform matrix into coordinates in a local coordinate system for the first image projection device, then calculating a second projection transform matrix usable to projection-transform the first intersection coordinates into intersection coordinates uniformly or substantially uniformly distributed in the first area, transforming the second intersection coordinates transformed by use of the first projection transform matrix into coordinates in a local coordinate system for the second image projection device, and then calculating a third projection transform matrix usable to projection-transform the second intersection coordinates into intersection coordinates uniformly or substantially uniformly distributed in the second area;

creating a first divided image to be output to the first image projection device and a second divided image to be output to the second image projection device; and transforming image data on the first divided image by use of the second projection transform matrix, transforming image data on the second divided image by use of the third projection transform matrix, and translating at least one of the first divided image and the second divided image toward a borderline between the first divided image and the second divided image to delete a gap between the first divided image and the second divided image.

8. An image projection method according to claim 7, further comprising:

storing, beforehand, a second checker sheet image including a third divided image to be projected to the first area and a fourth divided image to be projected to the second area, the second checker sheet image including a checkered pattern including horizontal lines and vertical lines, and also storing, beforehand, first design values for checker intersection coordinates in the third divided image, and second design values for checker intersection coordinates in the fourth divided image; and performing a projection transform on the third divided image by use of the second projection transform matrix, performing a projection transform on the fourth divided image by use of the third projection transform matrix, projecting the projection-transformed third divided image to the first area by the first projection device and projecting the projection-transformed fourth divided image to the second area by the second projection device to project the second checker sheet image to the image projection area, capturing the projected second checker sheet image by the image capturing device, detecting the checker intersection coordinates in the third divided image in the captured second checker sheet image and the checker intersection coordinates in the fourth divided image in the captured second checker sheet image, calculating a first difference between the detected checker intersection coordinates in the third divided image and the first design values and a second difference between the detected checker intersection coordinates in the fourth divided image and the second design values, and calculating a first translation matrix usable to translate the third divided image a distance corresponding to the first difference and a second translation matrix usable to translate the fourth divided image a distance corresponding to the second difference; and transforming the image data on the first divided image by use of the first translation matrix and the second projection transform matrix, and transforming the image data on the second divided image by use of the second transform matrix and the third projection transform matrix.

9. An image projection method according to claim 8, wherein equally or substantially equally dividing the large image to be projected to the image projection area into a first equally or substantially equally divided image and a second equally or substantially equally divided image along an equally or substantially equally dividing line, creating, as the first divided image to be output to the first projection device, a combination of the first equally or substantially equally divided image and a portion of the second equally or substantially equally divided image extending by a distance of a predetermined number of pixels from the equally or substantially equally dividing line, and creating, as the second divided image to be output to the second projection device, a combination of the second equally or substantially equally divided image and a portion of the first equally or substantially equally divided image extending by the distance of the predetermined number of pixels from the equally or substantially equally dividing line; and shifting an origin of the created first divided image toward the equally or substantially equally dividing line by the distance of the predetermined number of pixels to perform a correction before performing the transform by use of the second projection transform matrix and the first translation matrix, and shifting an origin of the created second divided image toward the equally or substantially equally dividing line by the distance of the predetermined number of pixels to perform a correction before performing the transform by use of the third projection transform matrix and the second translation matrix.

10. An image projection method according to claim 8, wherein the checker intersection coordinates in the third divided image and the checker intersection coordinates in the fourth divided image include a plurality of checker intersection coordinates that are closest to a borderline between the third divided image and the fourth divided image and are arranged in a direction parallel or substantially parallel to the borderline between the third divided image and the fourth divided image.

11. An image projection method for projecting a first divided image to a first area of an image projection area using a first image projection device and projecting a second divided image to a second area, adjacent to the first area, of the image projection area using a second image projection device to project a large image including the first divided image and the second divided image to the image projection area, the image projection method comprising:

capturing, with a lens of an image capturing device, an image of a first checker sheet including a checkered pattern including horizontal lines and vertical lines, the first checker sheet being placed on the image projection area;

correcting a distortion, caused by the lens, of a first checker sheet image as an image of the first checker sheet captured by the image capturing device, the distortion being corrected by use of an inside parameter of the image capturing device;

detecting checker intersection coordinates as intersection coordinates of the horizontal lines and the vertical lines in the post-correction first checker sheet image;

calculating a first transform matrix usable to projection-transform the detected checker intersection coordinates into checker intersection coordinates uniformly or substantially uniformly distributed in the image projection area;

creating a first spatial code image as a gray scale image from a first positive image and a first negative image projected to the first area by the first image projection device, the first positive image and the first negative image including a gray code pattern that has a luminance value varying in a horizontal direction, creating a second spatial code image as a gray scale image from a second positive image and a second negative image projected to the first area by the first image projection device, the second positive image and the second negative image including a gray code pattern that has a luminance value varying in a vertical direction, creating a third spatial code image as a gray scale image from a third positive image and a third negative image projected to the second area by the second image projection device, the third positive image and the third negative image including a gray code pattern that has a luminance value varying in the horizontal direction, and creating a fourth spatial code image as a gray scale image from a fourth positive image and a fourth negative image projected to the second area by the second image projection device, the fourth positive image and the fourth negative image including a gray code pattern that has a luminance value varying in the vertical direction;

acquiring a plurality of first border coordinates in the first spatial code image from a luminance distribution curve of the first positive image and the first negative image, acquiring a plurality of second border coordinates in the second spatial code image from a luminance distribution curve of the second positive image and the second negative image, acquiring a plurality of third border coordinates in the third spatial code image from a luminance distribution curve of the third positive image and the third negative image, and acquiring a plurality of fourth border coordinates in the fourth spatial code image from a luminance distribution curve of the fourth positive image and the fourth negative image;

acquiring first borderlines each connecting first border coordinates including the same code among the plurality of first border coordinates in the first spatial code image, second borderlines each connecting second border coordinates including the same code among the plurality of second border coordinates in the second spatial code image, third borderlines each connecting third border coordinates including the same code among the plurality of third border coordinates in the third spatial code image, and fourth borderlines each connecting fourth border coordinates including the same code among the plurality of fourth border coordinates in the fourth spatial code image; and synthesizing the first spatial code image and the second spatial code image and synthesizing the third spatial code image and the fourth spatial code image to acquire first intersection coordinates of the first borderlines and the second borderlines and second intersection coordinates of the third borderlines and the fourth borderlines;

transforming the first intersection coordinates and the second intersection coordinates by use of the first projection transform matrix, transforming the first intersection coordinates transformed by use of the first projection transform matrix into coordinates in a local coordinate system for the first image projection device, then calculating a second projection transform matrix usable to projection-transform the first intersection coordinates into intersection coordinates uniformly or substantially uniformly distributed in the first area, transforming the second intersection coordinates transformed by use of the first projection transform matrix into coordinates in a local coordinate system for the second image projection device, and then calculating a third projection transform matrix usable to projection-transform the second intersection coordinates into intersection coordinates uniformly or substantially uniformly distributed in the second area;

equally or substantially equally dividing the large image to be projected to the image projection area into a first equally or substantially equally divided image and a second equally or substantially equally divided image along an equally or substantially equally dividing line, creating, as the first divided image to be output to the first projection device, a combination of the first equally or substantially equally divided image and a portion of the second equally or substantially equally divided image extending by a distance of a predetermined number of pixels from the equally or substantially equally dividing line, and creating, as the second divided image to be output to the second projection device, a combination of the second equally or substantially equally divided image and a portion of the first equally or substantially equally divided image extending by the distance of the predetermined number of pixels from the equally or substantially equally dividing line; and shifting an origin of the created first divided image and an origin of the created second divided image toward the equally or substantially equally dividing line by the distance of the predetermined number of pixels to perform a correction of deleting a gap between the first divided image and the second divided image, transforming image data on the first divided image by use of the second projection transform matrix, and transforming image data on the second divided image by use of the third projection transform matrix.

12. An image projection method according to claim 11, wherein the distance of the predetermined number of pixels is longer than or equal to a length of the gap.

* * * * *